United States Patent
Ono

(10) Patent No.: US 11,284,237 B2
(45) Date of Patent: Mar. 22, 2022

(54) INFORMATION PROCESSING APPARATUS AND CONTROL METHOD

(71) Applicant: CANON KABUSHIKI KAISHA, Tokyo (JP)

(72) Inventor: Kaede Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/884,751

(22) Filed: May 27, 2020

(65) Prior Publication Data
US 2020/0382933 A1 Dec. 3, 2020

(30) Foreign Application Priority Data
May 31, 2019 (JP) .............................. JP2019-102860

(51) Int. Cl.
*H04W 4/80* (2018.01)
*H04W 76/10* (2018.01)

(52) U.S. Cl.
CPC ............. *H04W 4/80* (2018.02); *H04W 76/10* (2018.02)

(58) Field of Classification Search
CPC ... H04W 4/80; H04W 76/10; H04W 52/0251; H04W 84/18; Y02D 10/00; Y02D 30/70; G06F 3/1229; G06F 3/1226; G06F 3/1221; G06F 3/1212; G06F 3/1292; H04L 67/30; H04L 67/16
USPC ....................................................... 455/41.2
See application file for complete search history.

(56) References Cited

U.S. PATENT DOCUMENTS

2020/0137542 A1* 4/2020 Jung ...................... H04W 4/80

FOREIGN PATENT DOCUMENTS

JP 2017-188869 A 10/2017

* cited by examiner

*Primary Examiner* — Eugene Yun
(74) *Attorney, Agent, or Firm* — Canon U.S.A., Inc. I.P. Division

(57) ABSTRACT

A control method for an information processing apparatus that performs communication with a communication apparatus using Bluetooth Low Energy (BLE) includes performing first communication processing including autonomously establishing a connection using BLE, with the communication apparatus without receiving, from a user, an execution instruction for a predetermined function, performing second communication processing, in a case where an execution instruction for the predetermined function is received from the user which includes processing for establishing a connection using BLE with the communication apparatus, and performing Generic Attribute Profile (GATT) communication included in the predetermined function, via second communication processing, based on information indicating a structure of GATT data stored in the communication apparatus.

20 Claims, 13 Drawing Sheets

FIG.10

SERVICE
00000000-0000-1000-1000-00405f9b34fb

CHARACTERISTIC
00000000-0000-2000-1000-00405f9b34fb

DESCRIPTOR
00000000-0000-2000-1000-00405f9b3400

FIG. 11

| Service UUID | Service Name | Characteristic UUID | Characteristic Name | Service Able-to-Read | Service Able-to-Write | Characteristic Able-to-Read | Characteristic Able-to-Write | Characteristic Able-to-Indicate | Value | Pairing Needed |
|---|---|---|---|---|---|---|---|---|---|---|
| 0x1801 | GATT Service | 0x2A05 | Service Changed | ✓ | | | | ✓ | 0 | |
| | | 0x2B2A | Database Hash | | | ✓ | | | F0 CA 2D 48 EC F5 8B AC 8A AA 30 BB B9 FB A9 90 | |
| 0x180A | Device Information | 0x2A29 | Manufacturer Name String | ✓ | | ✓ | | | Printer Device | |
| | | 0x2A24 | Hardware Revision String | | | ✓ | | | 1010_AAA | |
| | | 0x2A25 | Firmware Revision String | | | ✓ | | | 2030000 | |
| | | 0x2A26 | Software Revision String | | | ✓ | | | 1 | |
| 00000000-0000-1000-1000-0040519b34fb | IJ Original | 00000000-0000-2000-1000-0040519b34fb | SSID | ✓ | | ✓ | | | Printer SSID | ✓ |
| | | 00000000-0000-2000-1000-0040519b34fc | Password | | | ✓ | | | aaaabbbb | ✓ |

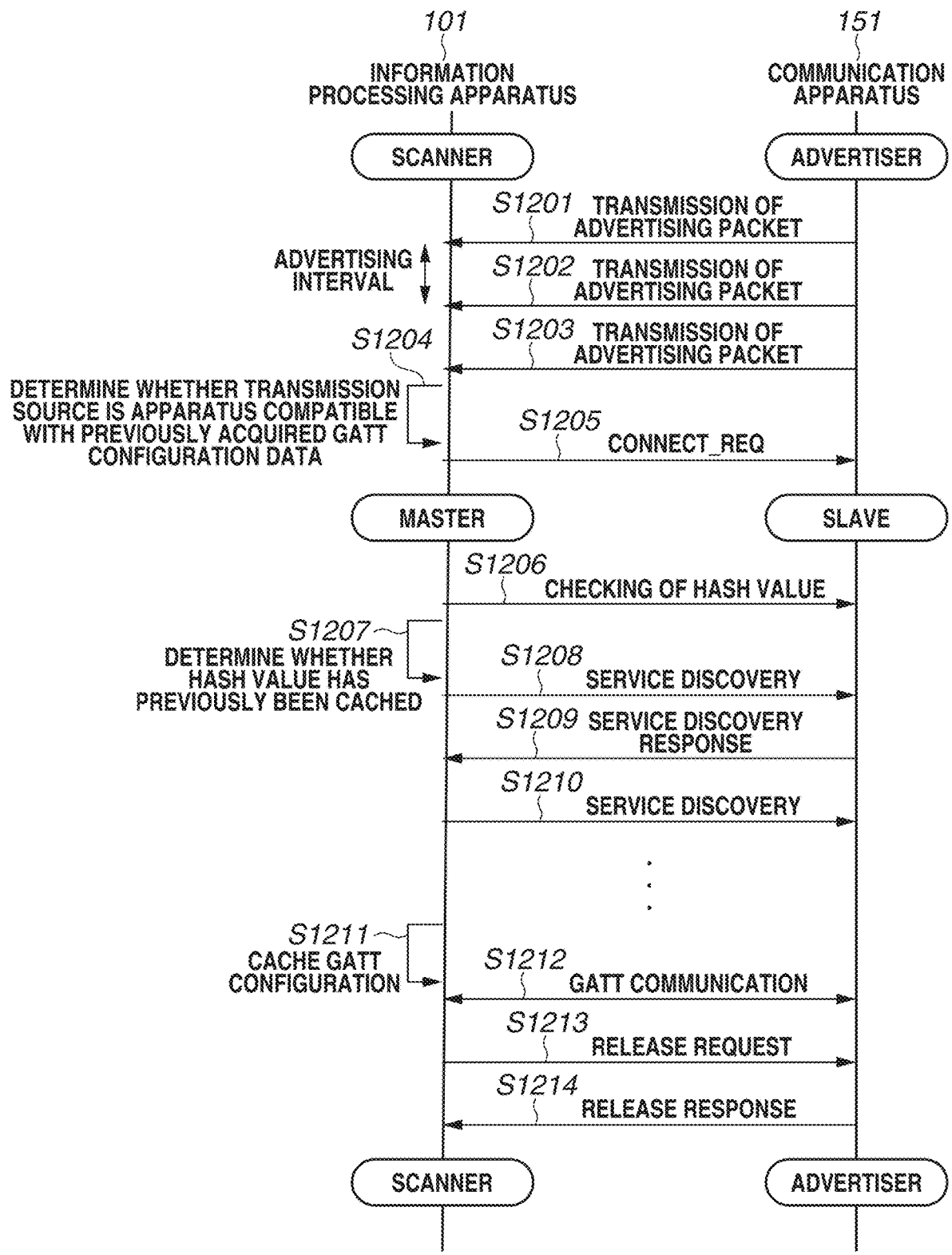

INFORMATION PROCESSING APPARATUS AND CONTROL METHOD

BACKGROUND OF THE DISCLOSURE

Field of the Disclosure

Aspects of the present disclosure generally relate to an information processing apparatus and a control method.

Description of the Related Art

There are known apparatuses which perform communications using Bluetooth® Low Energy (hereinafter referred to as "BLE"). Japanese Patent Application Laid-Open No. 2017-188869 discusses performing communication using BLE between an information processing apparatus, such as a smartphone, and a communication apparatus, such as a printer.

Furthermore, in BLE, a communication method, called GATT communication, which performs data communication by performing reading and writing with respect to Generic Attribute Profile (GATT) data which a communication apparatus has is used. To perform desired communication using GATT communication, an information processing apparatus is required to recognize a structure of GATT data which the communication apparatus has. Moreover, processing for acquiring information about the structure of the GATT data is referred to as "service discovery".

Therefore, prior to performing pairing with the communication apparatus, the information processing apparatus has to complete service discovery each time it is determined to execute a predetermined function including GATT communication in response to a user instruction, and, then, has to perform GATT communication corresponding to the user instruction.

However, since completing service discovery is time-consuming, there can be an issue in which the information processing apparatus is not able to promptly start GATT communication included in the predetermined function which is executed in response to the user instruction.

SUMMARY OF THE DISCLOSURE

Aspects of the present disclosure are generally directed to promptly starting GATT communication included in a predetermined function which is executed in response to a user instruction.

According to an aspect of the present disclosure, a control method for an information processing apparatus that performs communication with a communication apparatus using Bluetooth Low Energy (BLE) includes performing first communication processing including autonomously establishing a connection, using BLE, with the communication apparatus without receiving, from a user, an execution instruction for a predetermined function, performing second communication processing, in a case where an execution instruction for the predetermined function is received from the user which includes processing for establishing a connection using BLE with the communication apparatus, and performing Generic Attribute Profile (GATT) communication included in the predetermined function, via second communication processing, based on information indicating a structure of GATT data stored in the communication apparatus. In first communication processing, information indicating a structure of GATT data stored in the communication apparatus is acquired, and in second communication processing, at least part of information indicating a structure of GATT data stored in the communication apparatus is not acquired.

Further features of the present disclosure will become apparent from the following description of exemplary embodiments with reference to the attached drawings.

BRIEF DESCRIPTION OF THE DRAWINGS

FIG. 10 is a diagram illustrating a data format of the GATT.

FIG. 11 is a table illustrating an example of GATT data which is stored in a short-distance wireless communication unit.

FIG. 12 is a sequence diagram illustrating processing for caching GATT configuration data.

DESCRIPTION OF THE EMBODIMENTS

Various exemplary embodiments, features, and aspects of the disclosure will be described in detail below with reference to the drawings. However, an exemplary embodiment of the disclosure obtained by altering or improving, as appropriate, exemplary embodiments described below based on the ordinary skill in the art without departing from the gist of the disclosure should be construed to be included in the scope of the disclosure.

An information processing apparatus and a communication apparatus which are included in a communication system according to a first exemplary embodiment are described. While, in the first exemplary embodiment, a smartphone is taken as an example of the information processing apparatus, the first exemplary embodiment is not limited to this, and various apparatuses such as a portable terminal, a notebook personal computer (PC), a tablet terminal, a personal digital assistant (PDA), and a digital camera can be applied as the information processing apparatus. Moreover, while, in the first exemplary embodiment, a printer is taken as an example of the communication apparatus, the first exemplary embodiment is not limited to this, and various apparatuses can be applied as the communication apparatus as long as those are apparatuses capable of performing wireless communication with an information processing apparatus. For example, various printers such as an inkjet printer, a full-color laser beam printer, and a monochrome printer be applied as the communication apparatus. Moreover, not only printers but also various apparatuses such as a copying machine, a facsimile apparatus, a portable terminal, a smartphone, a notebook PC, a tablet terminal, a PDA, a digital camera, a music playback device, and a television set can be applied as the communication apparatus. Additionally, a multifunction peripheral equipped with a plurality of functions such as a copying function, a facsimile (FAX) function, and a printing function can also be applied as the communication apparatus.

Figure 1:
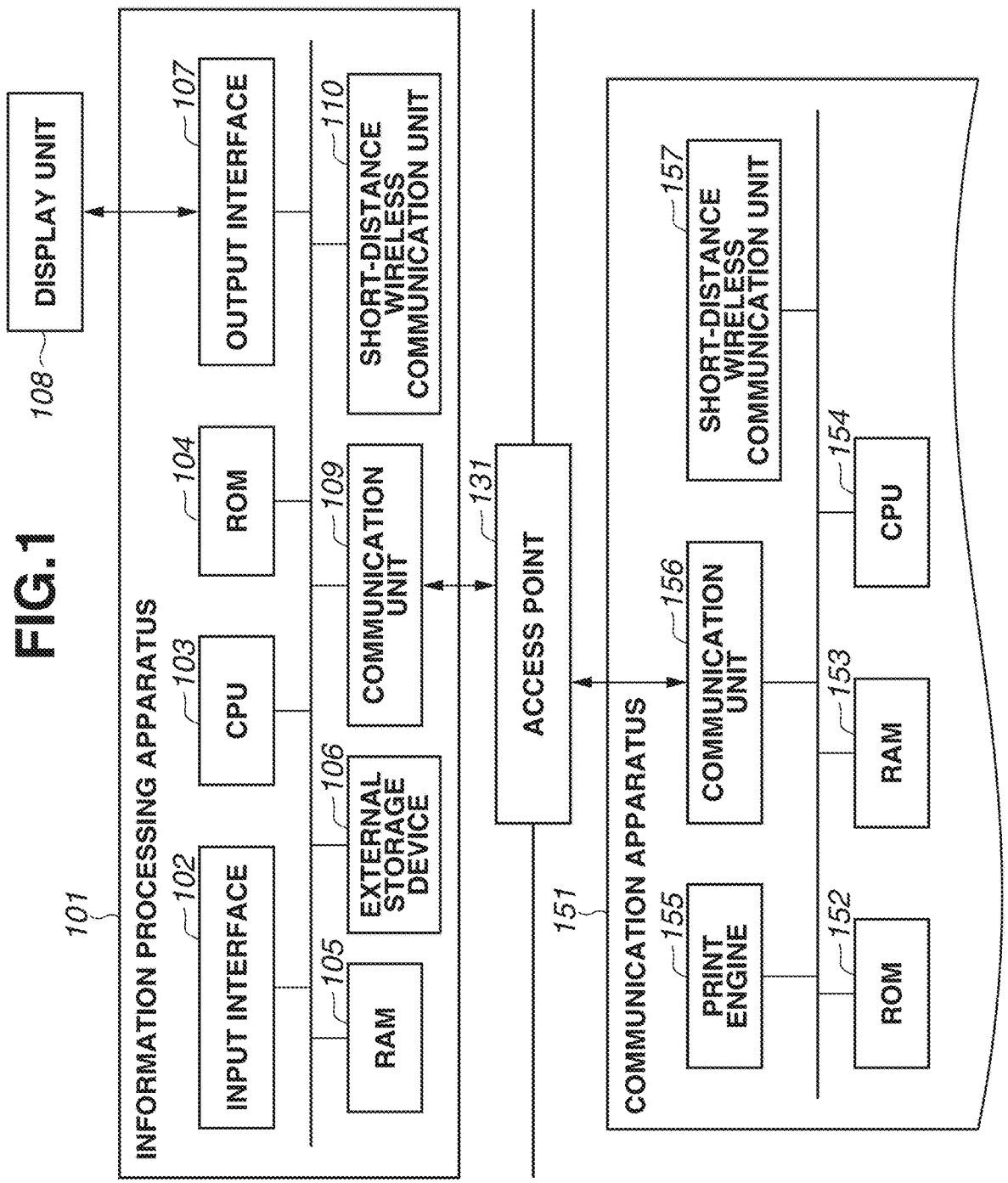
FIG. 1 is a diagram illustrating an example of configurations of an information processing apparatus and a communication apparatus.

First, configurations of an information processing apparatus in the first exemplary embodiment and a communication apparatus which is capable of performing communication with the information processing apparatus in the first exemplary embodiment are described with reference to the block diagram of FIG. 1. Moreover, while, in the first exemplary embodiment, the following configuration is described as an example, the first exemplary embodiment is an embodiment which is able to be applied to an apparatus capable of performing communication with the communication apparatus and is not limited in function to the configuration illustrated in FIG. 1.

The information processing apparatus 101 is an information processing apparatus according to the first exemplary embodiment. The information processing apparatus 101 includes, for example, an input interface 102, a central processing unit (CPU) 103, a read-only memory (ROM) 104, a random access memory (RAM) 105, an external storage device 106, an output interface 107, a display unit 108, a communication unit 109, and a short-distance wireless communication unit 110.

The input interface 102 is an interface used to receive a data input or an operation instruction from the user, and is configured with, for example, a physical keyboard, buttons, or a touch panel. Furthermore, a configuration in which the output interface 107, which is described below, and the input interface 102 are configured as a single structure and outputting of a screen and receiving of an operation instruction from the user are performed with such a single structure can be employed.

The CPU 103 serves as a system control unit and controls the entire information processing apparatus 101.

The ROM 104 stores fixed data such as control programs which the CPU 103 executes, a data table, and a built-in operating system (OS) program. In the first exemplary embodiment, the control programs stored in the ROM 104 are used to perform software execution control, such as scheduling, task switching, and interrupt processing, under the control of the built-in OS program stored in the ROM 104.

The RAM 105 is configured with, for example, a static random access memory (SRAM), which requires a backup power source. Furthermore, the RAM 105, in which data is retained with a primary battery for data backup (not illustrated), and is, therefore, able to store important data such as program control variables without volatilizing such import data. Moreover, a memory area used to store, for example, setting information for the information processing apparatus 101 and management data for the information processing apparatus 101 is provided in the RAM 105. Moreover, the RAM 105 is also used as a main memory and a work memory for the CPU 103.

The external storage device 106 stores, for example, an application for providing a printing execution function and a printing information generation program for generating printing information which a communication apparatus 151 is able to interpret. Moreover, the external storage device 106 stores, for example, various programs, such as a transmission and reception control program for information which is transmitted to and received from the communication apparatus 151, which is connected via the communication unit 109, and various pieces of information which are used by such programs.

The output interface 107 is an interface which performs control for the display unit 108 to display data or issue a notification of the state of the information processing apparatus 101.

The display unit 108 is configured with, for example, a light-emitting diode (LED) or a liquid crystal display (LCD) and displays data or issues a notification of the state of the information processing apparatus 101. Furthermore, a software keyboard equipped with, for example, numerical entry keys, mode setting keys, a fixing key, a cancel key, and a power-supply key can be installed on the display unit 108, so that an input from the user can be received via the display unit 108.

The communication unit 109 is a configuration which connects to, for example, the communication apparatus 151 and performs data communication therewith. For example, the communication unit 109 is able to connect to an access point (not illustrated) included in the communication apparatus 151. With the communication unit 109 and the access point included in the communication apparatus 151 connected to each other, the information processing apparatus 101 and the communication apparatus 151 become able to perform mutual communication with each other. Furthermore, the communication unit 109 can directly perform communication with the communication apparatus 151 via wireless communication or can perform communication with the communication apparatus 151 via an external access point (access point 131) located outside the information processing apparatus 101 and the communication apparatus 151. Examples of the wireless communication method include Wireless Fidelity (Wi-Fi) and Bluetooth®. Moreover, examples of the access point 131 include a device such as a wireless local area network (LAN) router. Furthermore, in the first exemplary embodiment, a method in which the information processing apparatus 101 and the communication apparatus 151 directly connect to each other without an external access point is referred to as a "direct connection method". Moreover, a method in which the information processing apparatus 101 and the communication apparatus 151 connect to each other via an external access point is referred to as an "infrastructure connection method".

The short-distance wireless communication unit 110 is a configuration which wirelessly connects to an apparatus such as the communication apparatus 151 at a short distance and performs data communication therewith, and performs communication in a communication method different from that of the communication unit 109. The short-distance wireless communication unit 110 is able to connect to a short-distance wireless communication unit 157 included in the communication apparatus 151. Furthermore, in the first exemplary embodiment, Bluetooth 5.1 is assumed to be used as the communication method employed for the short-distance wireless communication unit 110. Furthermore, while Bluetooth 5.1 includes both standards for Classic Bluetooth and Bluetooth Low Energy (BLE), in the first exemplary embodiment, BLE is assumed to be used as the communication method for the short-distance wireless communication unit 157.

The communication apparatus 151 is a communication apparatus in the first exemplary embodiment. The communication apparatus 151 includes, for example, a ROM 152, a RAM 153, a CPU 154, a print engine 155, a communication unit 156, and the short-distance wireless communication unit 157.

The communication unit 156 includes, as an access point included in the communication apparatus 151, an access point used to connect to an apparatus such as the information processing apparatus 101. Furthermore, the access point included in the communication unit 156 is able to connect to the communication unit 109 of the information processing apparatus 101. Furthermore, the communication unit 156 can directly perform communication with the information processing apparatus 101 via wireless communication, or can perform communication with the information processing apparatus 101 via the access point 131. Examples of the communication method include Wi-Fi and Bluetooth®. Moreover, the communication unit 156 can include hardware which functions as an access point, or can operate as an access point according to software which causes the communication unit 156 to function as an access point.

The short-distance wireless communication unit 157 is a configuration used to perform wireless connection to an apparatus such as the information processing apparatus 101 at a short distance. In the first exemplary embodiment, Bluetooth 5.1 is assumed to be used as the communication method for the short-distance wireless communication unit 157. More specifically, in the first exemplary embodiment, BLE is assumed to be used as the communication method for the short-distance wireless communication unit 157.

The RAM 153 is configured with, for example, an SRAM, which requires a backup power source. Furthermore, the RAM 153, in which data is retained with a primary battery for data backup (not illustrated), and is, therefore, able to store important data such as program control variables without volatilizing such import data. Moreover, a memory area used to store, for example, setting information for the communication apparatus 151 and management data for the communication apparatus 151 is provided in the RAM 153. Moreover, the RAM 153 is also used as a main memory and a work memory for the CPU 154, serves as a receive buffer used to temporarily store printing information received from the information processing apparatus 101, and stores various pieces of information.

The ROM 152 stores fixed data such as control programs which the CPU 154 executes, a data table, and a built-in OS program. In the first exemplary embodiment, the control programs stored in the ROM 152 are used to perform software execution control, such as scheduling, task switching, and interrupt processing, under the control of the built-in OS program stored in the ROM 152.

The CPU 154 serves as a system control unit and controls the entire communication apparatus 151.

The communication apparatus 151 performs image formation on a recording medium, such as paper, using, for example, ink based on information stored in the print engine 155 or the RAM 153 or a print job received from, for example, the information processing apparatus 101, and thus outputs a printed result. At this time, since a print job which is transmitted from, for example, the information processing apparatus 101 is large in the amount of transmitted data and requires high-speed communication, the communication apparatus 151 receives such a print job via the communication unit 156, which is able to perform communication at higher speed than the short-distance wireless communication unit 157.

Furthermore, a memory such as an external hard disk drive (HDD) or a Secure Digital card (SD card) can be mounted on the communication apparatus 151 as an optional device, and information which is stored in the communication apparatus 151 can be stored in such a memory.

Moreover, the communication apparatus 151 in the first exemplary embodiment is configured to have a connection mode set by connection setting processing, and performs communication with the information processing apparatus 101 according to a connection form that is based on the set connection mode. The communication apparatus 151 in the first exemplary embodiment has an infrastructure connection mode set as the connection mode when performing communication according to infrastructure connection, and has a direct connection mode set as the connection mode when performing communication according to direct connection.

While, here, sharing of processing operations between the information processing apparatus 101 and the communication apparatus 151 has been described above as an example, the first exemplary embodiment is not limited to this sharing manner but another sharing manner can be employed.

In the first exemplary embodiment, the information processing apparatus 101 is assumed to previously store a predetermined application in, for example, the ROM 104 or the external storage device 106. The predetermined application includes, for example, an application program for transmitting, to the communication apparatus 151, a print job for printing, for example, image data or document data stored in the information processing apparatus 101. An application having such a function is hereinafter referred to as a "printing application". Furthermore, the printing application can be equipped with, in addition to a printing function, other functions. For example, in a case where the communication apparatus 151 is equipped with a scanning function, the printing application can be equipped with, for example, a function of causing the communication apparatus 151 to scan an original set on the communication apparatus 151, a function of performing other settings on the communication apparatus 151, and a function of checking the status of the communication apparatus 151. Thus, the printing application can include a function of transmitting, in addition to a print job, a scan job or a setting job to the communication apparatus 151. Moreover, the predetermined application is not limited to a printing application, but can be an application program equipped with a function other than the printing function.

Figure 2:
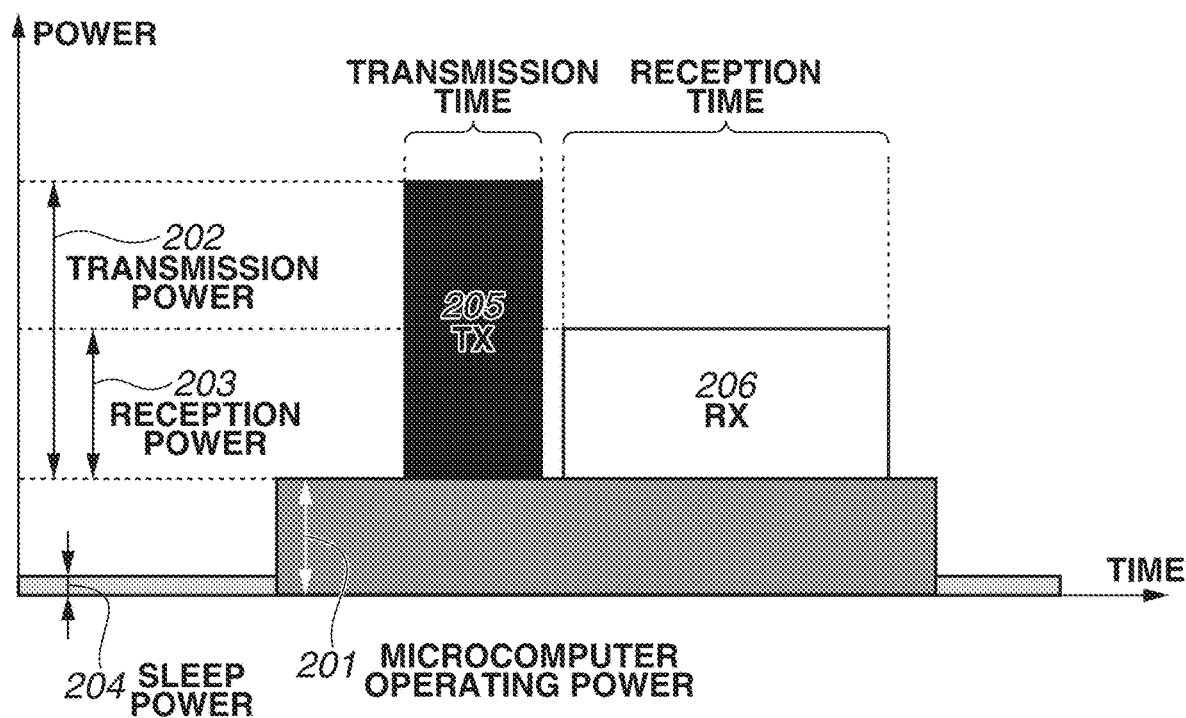
FIG. 2 is a diagram used to explain processing for broadcasting of advertising information and for reception of connection request information.

Moreover, in the description of the first exemplary embodiment, the short-distance wireless communication unit 110 and the short-distance wireless communication unit 157 are assumed to perform communication by BLE. Furthermore, in the first exemplary embodiment, the short-distance wireless communication unit 157 functions as an advertiser (or a slave) which broadcasts advertising information described below at predetermined intervals, and the short-distance wireless communication unit 110 functions as a scanner (or a master) which receives advertising information. Moreover, in the description of the first exemplary embodiment, the communication unit 109 and the communication unit 156 are assumed to perform communication via wireless LAN (Wi-Fi). Here, processing for transmission of advertising information in the BLE standard and reception of a BLE connection request is described. In the first exemplary embodiment, since, as mentioned above, the short-distance wireless communication unit 157 operates as a slave device, the short-distance wireless communication unit 157 is assumed to perform the above-mentioned processing. The short-distance wireless communication unit 157 performs communication using 40 channels (channel 0 to channel 39) into which a frequency band of 2.4 gigahertz (GHz) is divided. The short-distance wireless communication unit 157 uses the 37th to 39th channels of 40 channels for transmission of advertising information and reception of a BLE connection request, and uses the 0th to 36th channels for data communication performed after BLE connection. FIG. 2, in which the vertical axis indicates power consumed by the short-distance wireless communication unit 157 and the horizontal axis indicates time, separately illustrates, for each processing operation, power consumed by the short-distance wireless communication unit 157 at the time of transmission of advertising information using one channel. TX 205 represents overall consumed power in transmission processing, which is processing for broadcasting advertising information, and RX 206 represents overall consumed power in reception processing, which is processing for keeping a receiver for receiving a BLE connection request enabled. Transmission power 202 represents instantaneous consumed power in transmission processing. Moreover, reception power 203 represents instantaneous consumed power in reception processing. Moreover, microcomputer operating power 201 represents instantaneous consumed power which is consumed in a case where a microcomputer included in the short-distance wireless communication unit 157 is operating. Furthermore, the reason why the microcomputer is operating even before and after each of TX 205 and RX 206 and even between TX 205 and RX 206 is that the microcomputer is required to be previously started up for execution or stopping of transmission and reception processing. Moreover, in a case where the transmission of advertising information is performed in a plurality of channels, power consumption will increase as much as the number of channels in which to perform the transmission of advertising information. Moreover, during a period in which the microcomputer is not operating and the short-distance wireless communication unit 157 is in a power-saving state, sleep power 204 represents instantaneous consumed power of the short-distance wireless communication unit 157. In this way, after performing transmission processing using a predetermined channel, the short-distance wireless communication unit 157 performs reception processing for a predetermined time using the same channel, thus waiting for a BLE connection request to be transmitted from the information processing apparatus 101.

Figure 3:
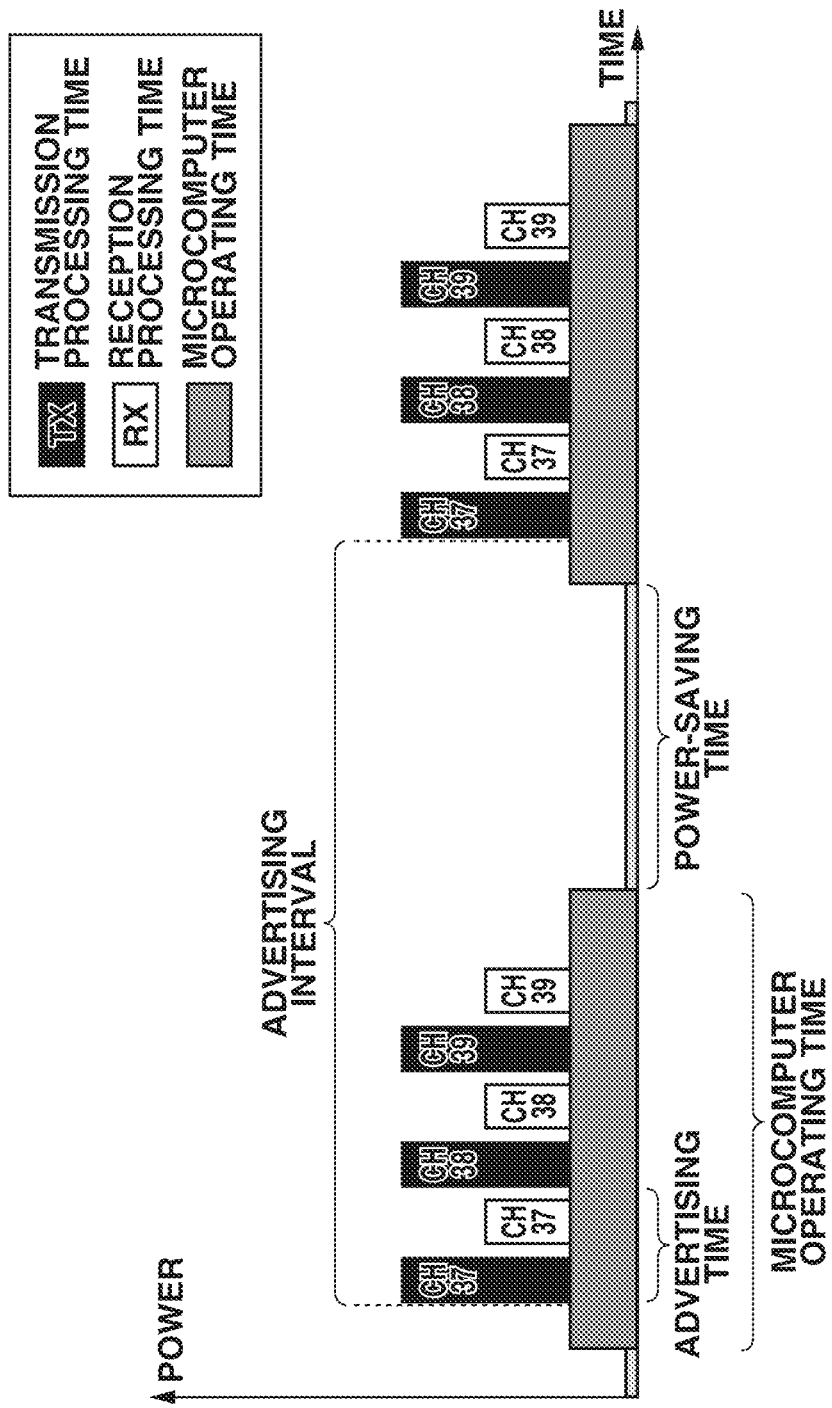
FIG. 3 is a diagram used to explain advertising in Bluetooth Low Energy (BLE).

Moreover, as illustrated in FIG. 3, the short-distance wireless communication unit 157 repeats transmission processing and reception processing for the advertising information three times in respective channels, and, after that, stops an operation of the microcomputer, thus entering into a power-saving state for a predetermined time. Hereinafter, a combination of transmission processing and reception processing for advertising information using a predetermined channel is referred to as "advertising". Moreover, a time interval at which to transmit advertising information using a predetermined channel is referred to as an "advertising interval". Furthermore, the number of times of advertising which is repeated from when the first advertising is performed until the microcomputer enters into a power-saving state is able to be optionally changed as long as it is three times or less. Moreover, while, in FIG. 3, channels for use in advertising are sequentially used in the order of the 37th, 38th, and 39th channels, this order can be made random, and respective different orders can be employed for advertising for the first time, advertising for the second time, and advertising for the third and subsequent times.

Figure 9:
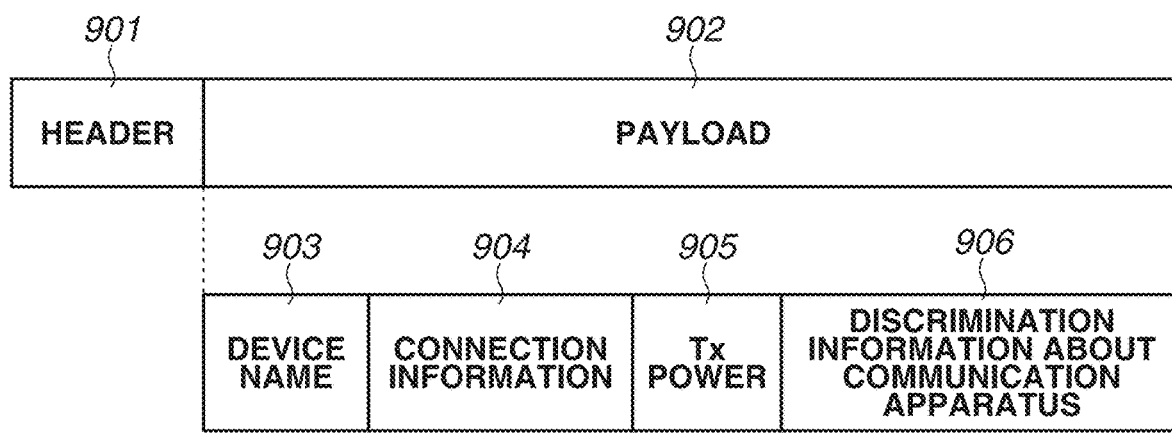
FIG. 9 is a diagram illustrating a structure of advertising information.

FIG. 9 illustrates an example of a structure of advertising information which the short-distance wireless communication unit 157 broadcasts to the communication apparatus 151 and surroundings thereof.

The short-distance wireless communication unit 157 performs initialization processing in response to starting of supply of electric power, and then enters into an advertising state. Upon entering into an advertising state, the short-distance wireless communication unit 157 periodically broadcasts advertising information to the surroundings thereof based on the advertising interval. The advertising information is a signal including basic header information (for example, identification information for identifying an apparatus which transmits the advertising information), and is configured with a header 901 and a payload 902. The information processing apparatus 101 is able to recognize the presence of the communication apparatus 151 by receiving the broadcast advertising information. Additionally, the information processing apparatus 101 is able to perform BLE connection with the communication apparatus 151 by transmitting a BLE connection request to the communication apparatus 151. The header 901 is a region in which to store, for example, information about the type of advertising information and the size of the payload 902. The payload 902 is used to store information about, for example, a device name 903 serving as identification information, mounted profile information, connection information 904 used for performing BLE connection with the communication apparatus 151, and transmission power (Tx power) 905 for advertising information. Furthermore, discrimination information 906 about a communication apparatus can be included in the advertising information. The discrimination information 906 about a communication apparatus includes, for example, a media access control (MAC) address of the communication apparatus, service information about the communication apparatus, the service set identifier (SSID) of an access point included in the communication apparatus, and a password.

In the first exemplary embodiment, the short-distance wireless communication unit 157 is assumed to enter into an advertising state when the communication apparatus 151 is powered on, thus starting transmission of advertising information. However, the timing at which the short-distance wireless communication unit 157 starts transmission of advertising information is not limited to the above-mentioned configuration, but can be, for example, timing at which a predetermined operation for enabling a BLE function has been performed.

Furthermore, for example, a configuration in which, in a case where the short-distance wireless communication unit 157 transmits first advertising information and then receives a scan response responsive to the first advertising information from the information processing apparatus 101, the short-distance wireless communication unit 157 transmits second advertising information which differs in content from the first advertising information can be employed. Furthermore, for example, the first advertising information is assumed to include, for example, information about transmission power required for transmitting advertising information and identification information for identifying the short-distance wireless communication unit 157. Then, the second advertising information is assumed to include, for example, discrimination information about the communication apparatus 151 and information about functions and hardware included in the communication apparatus 151. In the case of such a configuration, for example, a printing application is designed to handle the second advertising information. Therefore, in the following description, advertising information which the printing application handles is assumed to be the second advertising information.

Here, the general outline of Generic Attribute Profile (GATT) communication in the BLE standard is described. GATT is a profile which deals with read and write (transmission and reception) of information in the BLE standard.

In GATT communication, two roles, i.e., a GATT client and a GATT server, are defined based on a transfer source and a transfer destination of data.

The GATT client transmits a request to the GATT server, and receives a response from the GATT server. In the first exemplary embodiment, the information processing apparatus 101 serves as the GATT client. The GATT client is able to perform reading (read) of information stored in a storage region included in a short-distance wireless communication unit of the GATT server and writing (write) of information to the storage region.

Upon receiving a request from the GATT client, the GATT server returns a response to the GATT client. In the first exemplary embodiment, the communication apparatus 151 serves as the GATT server, and the information processing apparatus 101 serves as the GATT client. Furthermore, the GATT server operates as a device which stores information such as status information about the GATT server.

Next, a data format of GATT is described. Data in GATT has a hierarchical structure such as that illustrated in FIG. 10, and is configured with three elements called "service", "characteristic", and "descriptor". However, a descriptor does not need to be present, and, in the first exemplary embodiment, no descriptor is assumed to be present in GATT data which the short-distance wireless communication unit 157 configures. Each of a service, a characteristic, and a descriptor can be identified by a universally unique identifier (UUID), which is expressed by 32 digits. UUID as mentioned herein is a thing used as an identifier for uniquely identifying an object on software. UUID is a 128-bit number, but, ordinarily, is expressed by a hexadecimal number such as 550e8400-e29b-41d4-a716-446655440000. Furthermore, services, characteristics, and descriptors include, for example, those defined by the standard of Bluetooth SIG and those specific to a vendor. While the UUID of that specific to a vendor is expressed by 32 digits as mentioned above, the UUID of that defined by the standard of Bluetooth SIG is expressed by 4 digits. Specifically, for example, the UUID of that defined by the standard of Bluetooth SIG is expressed as 2A49.

Services are obtained by grouping attributes included in data of GATT for each common segmentation, and each service includes one or more characteristics. Characteristics have respective single values set for each characteristic. A descriptor has an attribute value set therein which is used when additional information is needed for a characteristic. Each of a service, a characteristic, and a descriptor is allowed to set an attribute for read and write which is a setting value indicating whether to permit a GATT client to perform read or write.

The GATT client is able to designate the UUIDs of the respective service and characteristic and perform read or write with respect to values which are set in the designated characteristic. However, whether the GATT client is able to perform read or write is based on the read and write attribute set in each service and each characteristic.

FIG. 11 illustrates an example of GATT data which is constructed by the short-distance wireless communication unit 157. In the GATT data illustrated in FIG. 11, column "Service UUID" represents a UUID assigned to each service. Column "Service Name" represents the name of each service. Column "Characteristic UUID" represents a UM assigned to each characteristic. Column "Characteristic Name" represents the name of each characteristic. Column "Service Able-to-Read" represents whether the information processing apparatus 101 is able to read (perform read of) values related to each service. Column "Service Able-to-Write" represents whether the information processing apparatus 101 is able to write (perform write of) values related to each service. Column "Characteristic Able-to-Read" represents whether the information processing apparatus 101 is able to read (perform read of) values related to each characteristic. Column "Characteristic Able-to-Write" represents whether the information processing apparatus 101 is able to write (perform write of) values related to each characteristic. Column "Characteristic Able-to-Indicate" represents whether, when having updated values related to each characteristic, the communication apparatus 151 is able to indicate (communicate) such an effect to the information processing apparatus 101. Column "Pairing Needed" represents whether pairing of values related to each characteristic having previously been performed is needed to permit the information processing apparatus 101 to perform write or read. In a case where "Service Able-to-Read" indicates "able to read" (check mark) and "Characteristic Able-to-Read" indicates "able to read" (check mark), the information processing apparatus 101 is able to read values related to the applicable characteristic. Moreover, in a case where "Service Able-to-Read" indicates "able to read" (check mark) and "Characteristic Able-to-Read" indicates "unable to read" (blank), the information processing apparatus 101 is unable to read values related to the applicable characteristic. Column "Value" represents a value which is set in each characteristic. Moreover, in a case where "Pairing Needed" indicates "paring unneeded" (blank), the information processing apparatus 101 is able to read or write values related to the applicable characteristic even in a state in which pairing is not performed with the communication apparatus 151. On the other hand, in a case where "Pairing Needed" indicates "paring needed" (check mark), unless pairing is performed with the communication apparatus 151, the information processing apparatus 101 is unable to read or write values related to the applicable characteristic.

To perform GATT communication with the communication apparatus 151 using BLE, the information processing apparatus 101 needs to acquire and recognize information about the above-mentioned configuration of GATT data (hereinafter referred to as "GATT configuration data") which the communication apparatus 151 stores. The GATT configuration data includes, for example, the number of services included in GATT data, the number of characteristics included therein, values of the respective UUIDs thereof, and attributes indicating able-to-read or unable-to-read, and does not include values of the respective characteristics. Processing for acquiring GATT configuration data which the communication apparatus 151 stores is referred to as "service discovery".

Furthermore, a certain length of time is required until service discovery is completed (GATT configuration data which the communication apparatus 151 stores is completely acquired by the information processing apparatus 101). Moreover, in the first exemplary embodiment, for example, when a transmission instruction for print data to the communication apparatus 151 is issued by the user, the information processing apparatus 101 performs GATT communication using BLE with the communication apparatus 151. A configuration in which completing service discovery is performed each time the information processing apparatus 101 is going to perform GATT communication using BLE with the communication apparatus 151 in response to a user instruction has an issue in which it takes time before GATT communication responsive to a user instruction is performed.

Therefore, in the first exemplary embodiment, in a case where the information processing apparatus 101 has already completed service discovery and have acquired and recognized GATT configuration data which the communication apparatus 151 stores, the information processing apparatus 101 does not perform service discovery to the last. Moreover, in the first exemplary embodiment, without being instructed by the user to perform service discovery, the information processing apparatus 101 automatically completes the first service discovery. Accordingly, in a case where the information processing apparatus 101 is going to perform GATT communication using BLE with the communication apparatus 151 in response to a user instruction, the information processing apparatus 101 is able to promptly start GATT communication responsive to the user instruction.

FIG. 12 is a sequence diagram illustrating processing for caching GATT configuration data performed between the information processing apparatus 101 and the communication apparatus 151. Furthermore, processing which is performed by the communication apparatus 151 in the processing sequence is implemented by the CPU 154 loading a control program stored in the ROM 152 or an HDD (not illustrated) included in the communication apparatus 151 onto the RAM 153 and executing the loaded control program. Moreover, processing which is performed by the information processing apparatus 101 in the processing sequence is implemented by the CPU 103 loading a control program or a printing application stored in the ROM 104 or an HDD (not illustrated) included in the information processing apparatus 101 onto the RAM 105 and executing the loaded control program. Moreover, processing which is performed by the information processing apparatus 101 is automatically performed in response to the printing application being invoked in the information processing apparatus 101. In other words, when the printing application is invoked, the information processing apparatus 101 starts receiving advertising information by the printing application.

In the following description, the communication apparatus 151 is assumed to be an advertiser and the information processing apparatus 101 is assumed to be a scanner.

In step S1201 to step S1203, the short-distance wireless communication unit 157 included in the communication apparatus 151 performs transmission of advertising information. The information processing apparatus 101 recognizes the presence of the communication apparatus 151 by the short-distance wireless communication unit 110 receiving the advertising information transmitted from the short-distance wireless communication unit 157. Furthermore, when having received advertising information in step S1201 to step S1203, the information processing apparatus 101 can determine whether to perform processing. In other words, the information processing apparatus 101 does not need to perform analytical processing with respect to all of the received pieces of advertising information. Specifically, the information processing apparatus 101 determines whether information corresponding to the printing application is included in the advertising information. The information corresponding to the printing application is, for example, information indicating that an apparatus serving as a transmission source of advertising information includes a printing function or information indicating a vendor which provides the printing application. Moreover, for example, the information corresponding to the printing application is information indicating that an apparatus serving as a transmission source of advertising information is a type of apparatus which is capable of issuing a printing instruction by the printing application. When receiving the advertising information and thus recognizing the communication apparatus 151, the information processing apparatus 101 acquires individual discrimination information included in the received advertising information. While the individual discrimination information used in the first exemplary embodiment is a unique address for discriminating a Bluetooth-compatible device called a Bluetooth Device Address (BD address), the first exemplary embodiment is not limited to this. For example, the individual discrimination information can be a MAC address, serial number, device name, or model number of the communication apparatus 151 or information corresponding to a unique format of the vendor thereof.

In step S1204, the information processing apparatus 101 determines whether the apparatus serving as a transmission source of advertising information acquired in step S1201 to step S1203 is an apparatus compatible with GATT configuration data which the information processing apparatus 101 has previously acquired. The apparatus compatible with GATT configuration data which the information processing apparatus 101 has previously acquired is, for example, an apparatus to which the information processing apparatus 101 has previously connected using BLE. Moreover, the apparatus compatible with GATT configuration data which the information processing apparatus 101 has previously acquired is, for example, an apparatus which is different from an apparatus to which the information processing apparatus 101 has previously connected using BLE but is an apparatus having the same discrimination information as discrimination information of the apparatus to which the information processing apparatus 101 has previously connected using BLE. Here, the discrimination information is, for example, a model number, name, vendor name, service name, or MAC address. In step S1204, specifically, the information processing apparatus 101 compares the individual discrimination information acquired anew in the above-described way with individual discrimination information stored in a memory (for example, the ROM 104) included in the information processing apparatus 101 and previously acquired from the apparatus compatible with GATT configuration data which the information processing apparatus 101 has previously acquired. In a case where, as a result of comparison, such two pieces of individual discrimination information match each other, the result of determination in step S1204 is YES. Then, in that case, since the information processing apparatus 101 has already performed service discovery with respect to the apparatus serving as a transmission source of advertising information acquired in step S1201 to step S1203 (or an apparatus corresponding to such an apparatus), the information processing apparatus 101 ends the processing without performing service discovery anew. On the other hand, in a case where such two pieces of individual discrimination information do not match each other, the result of determination in step S1204 is NO, and, then, the information processing apparatus 101 performs processing in step S1205 and subsequent steps. Furthermore, the individual discrimination information acquired anew may be a BD address generated at random by the communication apparatus 151. In that case, the information processing apparatus 101 can perform determination in step S1204 according to whether the acquired BD address is able to be decoded with use of a key called an identity resolution key (IRK) stored in a memory included in the information processing apparatus 101. In a case where the acquired BD address is able to be decoded, the result of determination in step S1204 is YES, and, in a case where the acquired BD address is not able to be decoded, the result of determination in step S1204 is NO.

In step S1205, the information processing apparatus 101 performs processing for connecting, using BLE, to an apparatus which has been determined to be an apparatus to which the information processing apparatus 101 has not previously connected using BLE (here, the communication apparatus 151). Specifically, the short-distance wireless communication unit 110 transmits CONNECT_REQ, which is a request for transition to a connection event which establishes network connection using BLE. When the short-distance wireless communication unit 157 has received CONNECT_REQ, the information processing apparatus 101 and the communication apparatus 151 make preparations for transitioning to the connection event. Specifically, the short-distance wireless communication unit 110 and the short-distance wireless communication unit 157 inform the CPU 103 and the CPU 154, respectively, of the completion of connection processing for GATT communication.

After that, the information processing apparatus 101 and the communication apparatus 151 transition from a scanner and an advertiser to a master and a slave, respectively, and the information processing apparatus 101 serving as a master and the communication apparatus 151 serving as a slave establish connection for GATT communication (BLE connection).

As mentioned above, before accessing GATT data in the communication apparatus 151 using GATT communication, the information processing apparatus 101 needs to acquire and recognize GATT data with which configuration the communication apparatus 151 stores.

Therefore, after BEE connection is established in step S1205, then in step S1206, the information processing apparatus 101 starts service discovery. Specifically, the information processing apparatus 101 transmits, to the communication apparatus 151, a discovery request for requesting GATT configuration data stored in the communication apparatus 151. Accordingly, as a response to the discovery request, the communication apparatus 151 transmits part of the GATT configuration data to the information processing apparatus 101. The information processing apparatus 101 identifies a region in which a type of information called a hash value is stored in the GATT data stored in the communication apparatus 151, based on the received part of the GATT configuration data, and then performs read of the hash value. Furthermore, the hash value is a value stored in Database Hash characteristic, the Characteristic UUID of which is 0x2B2A. The communication apparatus 151 stores, as the value of Database Hash characteristic, a hash value which the communication apparatus 151 has previously calculated from a configuration of the GATT data. In other words, the hash value is a value uniquely determined according to a configuration of the GATT data stored in the communication apparatus 151.

Furthermore, the information processing apparatus 101 previously stores a hash value which the information processing apparatus 101 has read from an apparatus to which the information processing apparatus 101 has previously connected using BLE, in a memory (for example, the ROM 104) included in the information processing apparatus 101. Therefore, in step S1207, the information processing apparatus 101 determines, by comparison, whether the hash value read in step S1206 matches one of previously read hash values (hash values stored in a memory included in the information processing apparatus 101). In other words, the information processing apparatus 101 determines whether the communication apparatus 151 is a terminal to which the information processing apparatus 101 has previously connected using BLE. At this time, the information processing apparatus 101 can use, as a determination condition, not only a hash value but also another type of information such as individual discrimination information, for example, the BD address of the communication apparatus 151.

In a case where the result of determination in step S1207 is NO, the information processing apparatus 101 continues service discovery to acquire and recognize a remaining piece of GATT configuration data stored in the communication apparatus 151. Therefore, in step S1208, the information processing apparatus 101 transmits, to the communication apparatus 151, a discovery request for requesting GATT configuration data stored in the communication apparatus 151. Upon receiving the discovery request, in step S1209, the communication apparatus 151 transmits a remaining piece of GATT configuration data to the information processing apparatus 101. Furthermore, the transmission and reception of a discovery request and the transmission and reception of GATT configuration data are repeated a number of times corresponding to the number of services, characteristics, and descriptors in GATT data, Therefore, in step S1210, the transmission and reception of a discovery request and the transmission and reception of GATT configuration data are repeated until the transmission of all of the pieces of GATT configuration data is completed.

When the transmission of all of the pieces of GATT configuration data is completed, in step S1211, the information processing apparatus 101 stores (preserves) GATT configuration data stored in the communication apparatus 151 as a cache in a memory included in the information processing apparatus 101. At this time, the information processing apparatus 101 associates the cache of GATT configuration data stored in the communication apparatus 151 with a hash value obtained from the communication apparatus 151, and then stores the GATT configuration data associated with the hash value in the memory. Furthermore, the information processing apparatus 101 can associate the GATT configuration data with another type of information such as individual discrimination information, for example, the MAC address of the communication apparatus 151, and then stores the GATT configuration data associated with such information in the memory. Moreover, the information processing apparatus 101 can associate the GATT configuration data with information about time at which caching was performed and then stores the GATT configuration data associated with such information in the memory. Furthermore, the service discovery is not processing for acquiring the value of a characteristic and is, therefore, processing which is able to be performed even in a state in which pairing is not being performed between the information processing apparatus 101 and the communication apparatus 151.

Furthermore, in a case where the result of determination in step S1207 is YES, since the information processing apparatus 101 already caches GATT configuration data stored in the communication apparatus 151, the information processing apparatus 101 omits processing in step S1208 to step S1211. Thus, the information processing apparatus 101 does not complete but interrupts service discovery.

When acquiring GATT configuration data stored in the communication apparatus 151, then, the information processing apparatus 101 becomes able to perform optional GATT communication with the communication apparatus 151. Therefore, in step S1212, the information processing apparatus 101 performs optional GATT communication with the communication apparatus 151.

Upon completion of GATT communication, in step S1213, the information processing apparatus 101 transmits a release request to the communication apparatus 151. Upon receiving the release request, in step S1214, the communication apparatus 151 transmits a release response to the information processing apparatus 101, thus ending BLE connection between the communication apparatus 151 and the information processing apparatus 101. When BLE connection between the communication apparatus 151 and the information processing apparatus 101 is ended, the information processing apparatus 101 and the communication apparatus 151 return to a scanner and an advertiser, respectively, and the communication apparatus 151 resumes transmission of advertising information.

Figure 4:
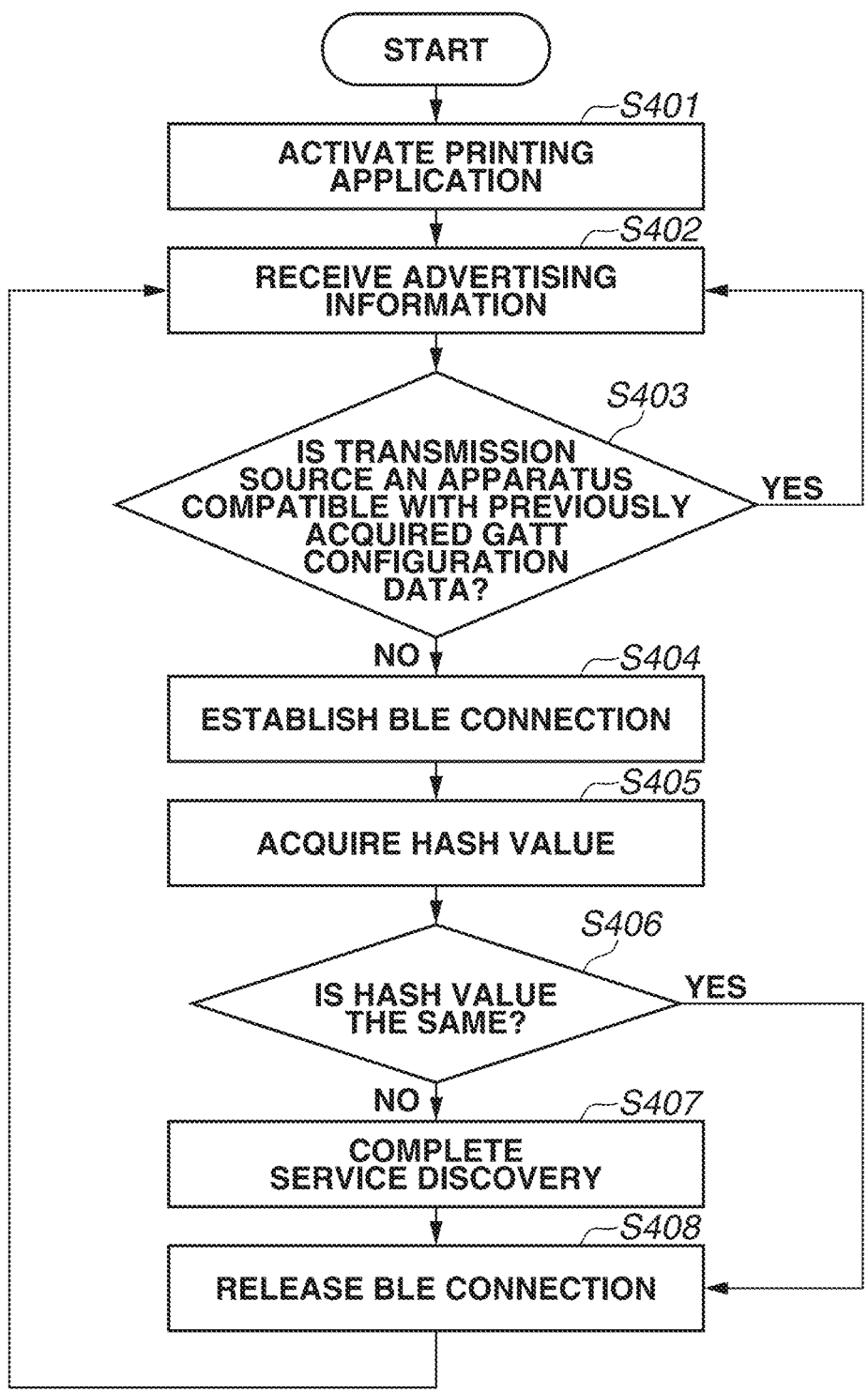
FIG. 4 is a flowchart illustrating processing for caching Generic Attribute Profile (GATT) configuration data.

FIG. 4 is a flowchart illustrating processing (first communication processing) for caching GATT configuration data, which is performed by the information processing apparatus 101. The present processing is implemented by the CPU 103 loading a control program and a printing application stored in the ROM 104 or an HDD (not illustrated) included in the information processing apparatus 101 onto the RAM 105 and executing the control program and the printing application. Moreover, the present processing is started based on an instruction for activating the printing application being issued in the information processing apparatus 101.

In step S401, the CPU 103 activates the printing application as foreground processing.

In step S402, the CPU 103 receives advertising information.

In step S403, the CPU 103 determines whether the apparatus serving as a transmission source of the received advertising information is an apparatus compatible with the GATT configuration data which the information processing apparatus 101 has previously acquired. If the result of determination in step S403 is NO, the CPU 103 advances the processing to step S404, and, if the result of determination in step S403 is YES, the CPU 103 does not perform service discovery with respect to the apparatus serving as a transmission source of the received advertising information, and waits for receiving advertising information from another apparatus in step S402. The present processing corresponds to processing in step S1204.

In step S404, the CPU 103 establishes BLE connection between the information processing apparatus 101 and the apparatus serving as a transmission source of the received advertising information, and then starts service discovery. The present processing corresponds to processing in step S1205.

In step S405, the CPU 103 performs acquisition of a hash value from the apparatus serving as a transmission source of the received advertising information. The present processing corresponds to processing in step S1206.

In step S406, the CPU 103 determines whether the hash value acquired in step S405 is the same as the previously acquired hash value. If the result of determination in step S406 is NO, the CPU 103 advances the processing to step S407, and, if the result of determination in step S406 is YES, the CPU 103 interrupts service discovery with respect to the apparatus serving as a transmission source of the received advertising information, and then advances the processing to step S408. The present processing corresponds to processing in step S1207. Furthermore, if there is no previously acquired hash value, the result of determination in step S406 is NO.

In step S407, the CPU 103 continues service discovery, and acquires and caches a remaining piece of GATT configuration data. The present processing corresponds to processing in step S1208 to step S1211.

In step S408, the CPU 103 releases BLE connection between the information processing apparatus 101 and the apparatus serving as a transmission source of the received advertising information. The present processing corresponds to processing in step S1213 and step S1214. After that, the CPU 103 waits for receiving advertising information from another apparatus in step S402.

In this way, in the first exemplary embodiment, the information processing apparatus 101 automatically establishes BLE connection between the information processing apparatus 101 and the communication apparatus 151 without receiving a user operation performed after the printing application is activated, and then automatically performs service discovery. Then, the information processing apparatus 101 automatically caches information about a GATT data structure of the communication apparatus 151. Therefore, in the first exemplary embodiment, even in a case where an instruction for GATT communication between the information processing apparatus 101 and the communication apparatus 151 is first issued, it is possible to omit at least a part of service discovery and, thus, it is possible to promptly start GATT communication for which the user issues an instruction.

Furthermore, the timing at which the printing application automatically establishes BLE connection between the information processing apparatus 101 and the communication apparatus 151 and automatically performs service discovery is not limited to that described above. Any timing can be employed as long as it is before the user consciously issues an instruction for establishing BLE connection between the information processing apparatus 101 and the communication apparatus 151 (for example, an instruction for handover). For example, a configuration in which the above-described processing is automatically performed in response to an instruction for displaying a screen used to select an image targeted for printing being issued to the printing application can be employed.

Moreover, when receiving advertising information from a plurality of apparatuses, the information processing apparatus 101 can perform service discovery with respect to each of the plurality of apparatuses and can cache information about a GATT data structure of each of the plurality of apparatuses.

Moreover, in the first exemplary embodiment, the processing in step S405 to step S407 is assumed to be processing which is processed by the OS included in the information processing apparatus 101. In other words, in step S404, in a case where an instruction for establishment of BLE connection has been issued by the printing application to the OS of the information processing apparatus 101, the acquisition of a hash value and service discovery are assumed to be automatically performed by the OS. However, the first exemplary embodiment is not limited to this, and processing in step S405 to step S407 can be performed based on, for example, an instruction issued by the printing application.

In the first exemplary embodiment, as mentioned in the above description, the printing application automatically causes the information processing apparatus 101 to perform service discovery, thus caching information about a GATT data structure of the communication apparatus 151. Accordingly, after that, even if an instruction for establishment of BLE connection between the information processing apparatus 101 and the communication apparatus 151 has been issued by the user, it is possible to omit execution of service discovery. As a result, it is possible to promptly start processing which is performed in response to establishment of BLE connection.

Figure 13:
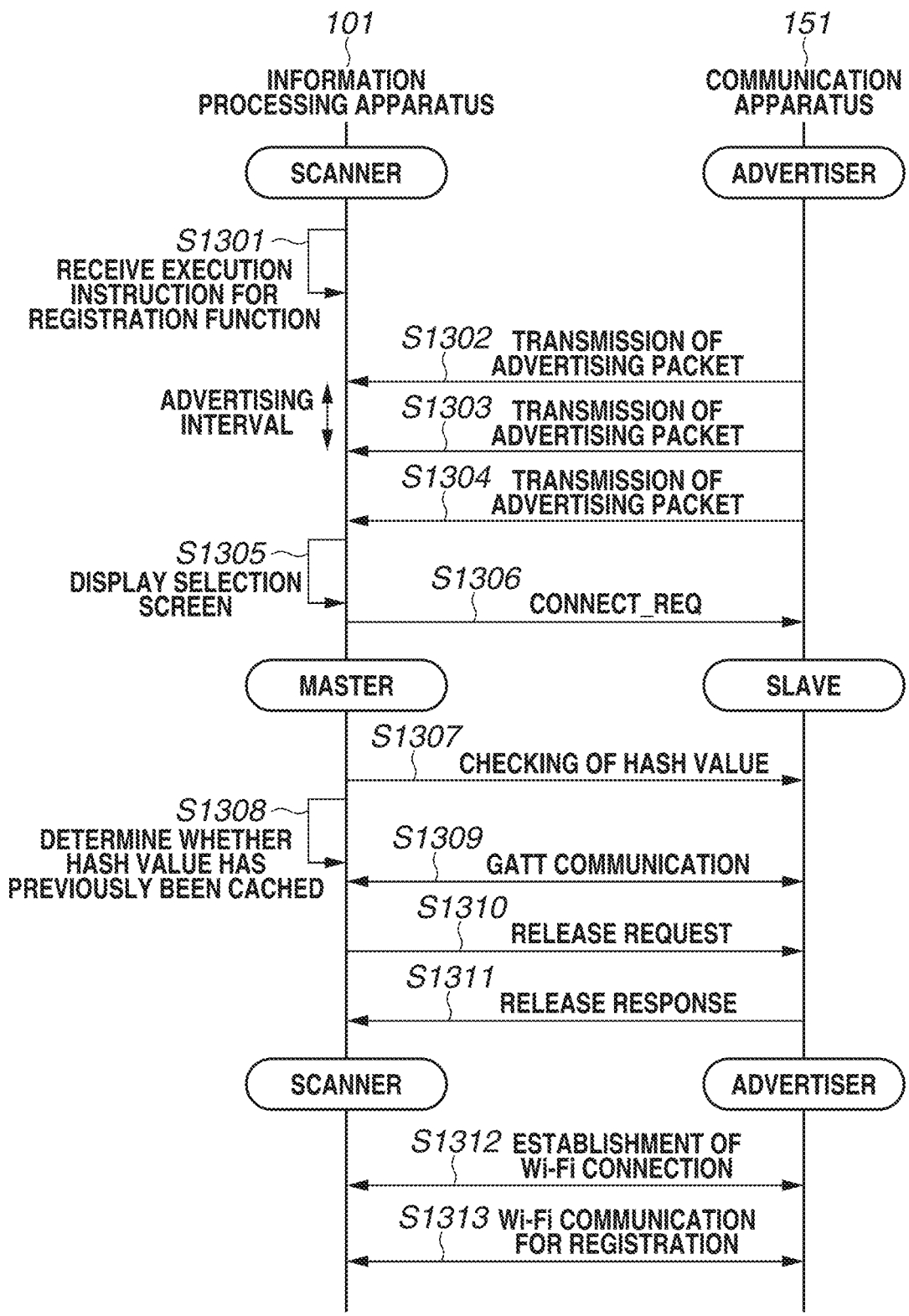
FIG. 13 is a sequence diagram illustrating processing for a registration function.

In the first exemplary embodiment, as an example of processing which is performed in response to establishment of BLE connection, a registration function of registering information about the communication apparatus 151 with the printing application is performed. FIG. 13 is a sequence diagram illustrating the registration function, which is performed between the information processing apparatus 101 and the communication apparatus 151, Furthermore, processing which is performed by the communication apparatus 151 in the processing sequence is implemented by the CPU 154 loading a control program stored in the ROM 152 or an HDD (not illustrated) included in the communication apparatus 151 onto the RAM 153 and executing the loaded control program. Moreover, processing which is performed by the information processing apparatus 101 in the processing sequence is implemented by the CPU 103 loading a control program or a printing application stored in the ROM 104 or an HDD (not illustrated) included in the information processing apparatus 101 onto the RAM 105 and executing the loaded control program. Moreover, processing which is performed by the information processing apparatus 101 is assumed to be started in a state in which the printing application is activated in the information processing apparatus 101. Moreover, the present processing is assumed to be started in a state in which paring of RUE is still not performed between the information processing apparatus 101 and the communication apparatus 151.

In the following description, the communication apparatus 151 is assumed to be an advertiser and the information processing apparatus 101 is assumed to be a scanner.

In step S1301, the information processing apparatus 101 receives an instruction for execution of the registration function from the user. Specifically, for example, the information processing apparatus 101 receives, from the user, an operation (for example, pressing of a button) performed to issue an instruction for execution of the registration function on a screen which is displayed by the printing application. In response to this operation, the information processing apparatus 101 starts reception of advertising information by the printing application.

In step S1302 to step S1304, the short-distance wireless communication unit 157 included in the communication apparatus 151 performs transmission of advertising information. The information processing apparatus 101 recognizes the presence of the communication apparatus 151 by the short-distance wireless communication unit 110 receiving the advertising information transmitted from the short-distance wireless communication unit 157. Furthermore, at this time, the information processing apparatus 101 may receive advertising information not only from the communication apparatus 151 but also from an apparatus other than the communication apparatus 151.

In step S1305, the information processing apparatus 101 displays, on the display unit 108, a selection screen for receiving selection of an apparatus targeted for the registration function. Specifically, the information processing apparatus 101 displays, on the display unit 108, a list of pieces of discrimination information about apparatuses serving as a transmission source of advertising information received in step S1302 to step S1304. Furthermore, the discrimination information is included in the advertising information and is, for example, a BD address, MAC address, Internet Protocol (IP) address, model number, or model name. Then, the information processing apparatus 101 receives, from the user, selection of an apparatus targeted for the registration function via the selection screen, and identifies the selected apparatus as a target for the registration function. In the following description, the communication apparatus 151 is assumed to have been selected as a target for the registration function. Furthermore, in a case where, during a period from step S1302 to step S1304, the information processing apparatus 101 has received advertising information from only one apparatus, the information processing apparatus 101 can identify such one apparatus as a target for the registration function without displaying the selection screen on the display unit 108.

In step S1306, the information processing apparatus 101 performs processing for connecting to the communication apparatus 151 using BLE. Specifically, the short-distance wireless communication unit 110 transmits CONNECT_REQ, which is a request for transition to a connection event which establishes network connection using BLE.

After that, the information processing apparatus 101 and the communication apparatus 151 transition from a scanner and an advertiser to a master and a slave, respectively, and the information processing apparatus 101 serving as a master and the communication apparatus 151 serving as a slave establish connection for GATT communication (BLE connection).

After BLE connection is established in step S1306, then in step S1307, the information processing apparatus 101 starts service discovery. Specifically, the information processing apparatus 101 transmits, to the communication apparatus 151, a discovery request for requesting GATT configuration data stored in the communication apparatus 151. Accordingly, as a response to the discovery request, the communication apparatus 151 transmits part of the GATT configuration data to the information processing apparatus 101. The information processing apparatus 101 determines whether it is possible to identify a region in which a hash value is stored in the GATT data stored in the communication apparatus 151 based on the received part of the GATT configuration data. Then, in a case where the result of determination is YES, the information processing apparatus 101 request information contained in the identified region, thus performing read of the hash value. On the other hand, in a case where the result of determination is NO, the information processing apparatus 101 repeats a discovery request and reception of part of the GATT configuration data until receiving GATT configuration data based on which a region in which a hash value is stored is able to be identified.

Furthermore, the information processing apparatus 101 previously stores a hash value which the info titian processing apparatus 101 has acquired from an apparatus to which the information processing apparatus 101 has previously connected using BLE, in a memory (for example, the ROM 104) included in the information processing apparatus 101. Therefore, in step S1308, the information processing apparatus 101 determines, by comparison, whether the hash value read in step S1307 matches one of previously read hash values (hash values stored in a memory included in the information processing apparatus 101). At this time, the information processing apparatus 101 can use, as a determination condition, not only a hash value but also another type of information such as individual discrimination information, for example, the MAC address of the communication apparatus 151.

Furthermore, in the first exemplary embodiment, the information processing apparatus 101 automatically performs service discovery beforehand as illustrated in FIG. 12. Therefore, unless in a case where, for example, an apparatus targeted for registration has activated BLE immediately before execution of the registration function, the result of determination in step S1308 is YES, so that the information processing apparatus 101 is able to omit later-stage processing of service discovery. As a result, when the user consciously performs processing using BLE connection (when the user executes the registration function using BLE), the information processing apparatus 101 is able to promptly start such processing without making the user wait. Furthermore, in a case where the result of determination in step S1308 is NO, the information processing apparatus 101 performs remaining service discovery in the way illustrated in FIG. 12, thus completing service discovery, and then advances the processing to step S1309.

Furthermore, in the above description, a configuration in which, after BLE connection is established in step S1306, then in step S1307, the information processing apparatus 101 starts service discovery and performs up to reading of a hash value has been described. Such a method of starting service discovery and trying to acquire a hash value is hereinafter referred to as a "first acquisition method". However, the first exemplary embodiment is not limited to the first acquisition method. A configuration of acquiring a hash value using another acquisition method (a second acquisition method) is specifically described as follows.

In step S1307, without starting service discovery, the information processing apparatus 101 identifies, based on the cached GATT configuration data, an identifier for identifying a region in which a hash value out of GATT data corresponding to the cached GATT configuration data is contained. The identifier to be identified is, for example, a handle value. Then, the information processing apparatus 101 directly requests a value contained in the region corresponding to the identified identifier from the communication apparatus 151, thus acquiring the requested value. Such a method of trying to acquire a hash value without starting service discovery is hereinafter referred to as a "second acquisition method". At this time, in a case where the communication apparatus 151 stores the same GATT configuration data as the GATT configuration data cached by the information processing apparatus 101, eventually, the information processing apparatus 101 acquires the same value as the cached hash value. On the other hand, in a case where the communication apparatus 151 stores GATT configuration data which is not the same as the GATT configuration data cached by the information processing apparatus 101, eventually, the information processing apparatus 101 acquires a value different from the cached hash value. Furthermore, the value to be acquired at this time is a hash value but may be a value different from the cached hash value, or may originally not be a hash value. Then, in step S1308, the information processing apparatus 101 determines whether the information acquired at this time and the cached hash value match each other. Then, if the result of determination in step S1308 is YES, the information processing apparatus 101 entirely omits service discovery. On the other hand, if the result of determination in step S1308 is NO, the information processing apparatus 101 completes service discovery and then advances the processing to step S1309. Furthermore, in a case where there is a plurality of pieces of cached GATT configuration data, the information processing apparatus 101 can perform identification of an identifier that is based on GATT configuration data and acquisition of information using such an identifier a plurality of times corresponding to up to the number of pieces of cached GATT configuration data until the result of determination in step S1308 becomes YES. Alternatively, in a case where there is a plurality of pieces of cached GATT configuration data, the information processing apparatus 101 can perform the above-mentioned identification and acquisition based on only GATT configuration data compatible with the BLE-connected communication apparatus 151 out of the plurality of pieces of cached GATT configuration data. The GATT configuration data compatible with the BLE-connected communication apparatus 151 is, in other words, GATT configuration data which is likely to be GATT configuration data stored in the BLE-connected communication apparatus 151. Specifically, for example, the GATT configuration data compatible with the BLE-connected communication apparatus 151 is GATT configuration data acquired from an apparatus having the same identifier as that of the BLE-connected communication apparatus 151. The identifier is, for example, information indicating, for example, a name or model name of the apparatus, a vendor of the apparatus, or a service which the apparatus provides. This configuration enables entirely omitting service discovery with respect to an apparatus having the cached GATT configuration data. Furthermore, the information to be acquired by the second acquisition method does not need to be a hash value. For example, the information processing apparatus 101 can identify, based on the cached GATT configuration data, an identifier for identifying a region in which a specific value different from a hash value out of GATT data corresponding to the cached GATT configuration data is contained. Then, the information processing apparatus 101 can directly request a value contained in the region corresponding to the identified identifier from the communication apparatus 151, thus acquiring the requested value. Then, the information processing apparatus 101 can determine whether the information acquired at this time and the cached specific value match each other. However, since a value other than hash values may be changed in spite of the fact that the configuration of GATT data is unchanged, for a correct determination to be performed, it is favorable that a hash value is used.

Using GATT configuration data stored in the communication apparatus 151 enables the information processing apparatus 101 to perform optional GATT communication with the communication apparatus 151. Therefore, in step S1309, the information processing apparatus 101 performs communication of various pieces of information using GATT communication that is based on GATT configuration data stored in the communication apparatus 151. Specifically, the information processing apparatus 101 acquires, for example, first connection information used for Wi-Fi-connecting to a communication apparatus 151 operating as AP mode 1, second connection information used for Wi-Fi-connecting to a communication apparatus 151 operating as AP mode 2, and discrimination information about the communication apparatus 151. Furthermore, the AP mode is a mode in which a predetermined access point (AP) included in the information processing apparatus 101 is enabled and the information processing apparatus 101 operates as an AP. Specifically, the connection information s, for example, an SSID or a password. Moreover, the discrimination information about the communication apparatus 151 is, for example, a serial number of the communication apparatus 151, a MAC address of the communication apparatus 151, or a Bonjour name of the communication apparatus 151. Furthermore, the information processing apparatus 101 can acquire the second connection information not using BLE communication performed in step S1309 but using Wi-Fi communication performed in step S1313 described below. Furthermore, in a case where the information processing apparatus 101 has not yet performed pairing with the communication apparatus 151, the information processing apparatus 101 can perform pairing with the communication apparatus 151 before acquiring the above-mentioned various pieces of information. Moreover, after acquiring the above-mentioned various pieces of information, the information processing apparatus 101 transmits an instruction for causing the communication apparatus 151 to operate as AP mode 1 to the communication apparatus 151 via GATT communication. Accordingly, the communication apparatus 151 starts operating as AP mode 1. Furthermore, in the first exemplary embodiment, when operating as AP mode 1, the communication apparatus 151 is assumed to use a frequency band of 2.4 GHz for Wi-Fi connection, but can use a frequency band of 5 GHz therefor.

In step S1310, the information processing apparatus 101 transmits a release request. In step S1311, upon receiving the release request, the communication apparatus 151 transmits a release response, thus ending BLE connection between the information processing apparatus 101 and the communication apparatus 151. When BLE connection between the information processing apparatus 101 and the communication apparatus 151 is ended, the information processing apparatus 101 and the communication apparatus 151 return to a scanner and an advertiser, respectively, and, then, the communication apparatus 151 starts transmission of advertising information. Furthermore, while, here, a configuration of releasing BLE connection after GATT communication has been described, the first exemplary embodiment is not limited to this configuration. At this time, processing in step S1310 and step S1311 can be omitted, so that BLE connection can be maintained.

In step S1312, the information processing apparatus 101 establishes Wi-Fi connection between the communication apparatus 151 operating as AP mode 1 and the information processing apparatus 101 by using the first connection information acquired in step S1309. Furthermore, before establishing Wi-Fi connection between the communication apparatus 151 operating as AP mode 1 and the information processing apparatus 101, the information processing apparatus 101 previously stores Wi-Fi setting of the information processing apparatus 101 obtained before establishment of such Wi-Fi connection.

In step S1313, the information processing apparatus 101 performs Wi-Fi communication for registering the communication apparatus 151 with the printing application. Specifically, first, the information processing apparatus 101 acquires information for registering the communication apparatus 151 with the printing application from the communication apparatus 151 via Wi-Fi connection. The information for registering the communication apparatus 151 with the printing application is, for example, information about capability of the communication apparatus 151 or a serial number or MAC address of the communication apparatus 151. Moreover, the information about capability of the communication apparatus 151 is, for example, information about a recording medium which the communication apparatus 151 is able to use for printing, information indicating whether the communication apparatus 151 is able to perform duplex printing, or information indicating whether the communication apparatus 151 is able to perform color printing. When the communication apparatus 151 is registered with the printing application, a button for receiving a transmission instruction for a job from the user is enabled. Thus, the information processing apparatus 101 is able to transmit a job via the printing application to the communication apparatus 151 registered with the printing application. Moreover, the printing application is able to display a print setting screen based on the received information about capability of the communication apparatus 151. Then, the printing application is able to generate a print job based on a print setting input via the print setting screen.

After that, in Wi-Fi communication, the information processing apparatus 101 transmits an instruction for stopping an operation as AP mode 1 to the communication apparatus 151 via Wi-Fi connection. Upon receiving the transmitted instruction, the communication apparatus 151 stops operating as AP mode 1, and returns Wi-Fi setting of the communication apparatus 151 to a state obtained before the communication apparatus 151 operates as AP mode 1. Furthermore, at this time, the information processing apparatus 101 also returns Wi-Fi setting of the information processing apparatus 101 to a state obtained before the information processing apparatus 101 establishes Wi-Fi connection in step S1312. Specifically, the CPU 103 returns, based on the information stored in step S1312, a connection destination for Wi-Fi of the information processing apparatus 101 to a connection destination obtained before the information processing apparatus 101 establishes Wi-Fi connection in step S1312. Furthermore, in a case where another Wi-Fi connection has not been established before the information processing apparatus 101 establishes Wi-Fi connection in step S1312, the information processing apparatus 101 simply stops Wi-Fi connection between the communication apparatus 151 and the information processing apparatus 101.

In this way, registering the communication apparatus 151 targeted for communication with the printing application enables the information processing apparatus 101 to then transmit a job to the communication apparatus 151 targeted for communication. Furthermore, the registration function causes the communication apparatus 151 to start operating as AP mode 2. Therefore, when an instruction for transmitting a job is issued by the user, the information processing apparatus 101 performs Wi-Fi connection with the communication apparatus 151 operating as AP mode 2 using the second connection information, and transmits a job to the communication apparatus 151 via such Wi-Fi connection.

Figure 5:
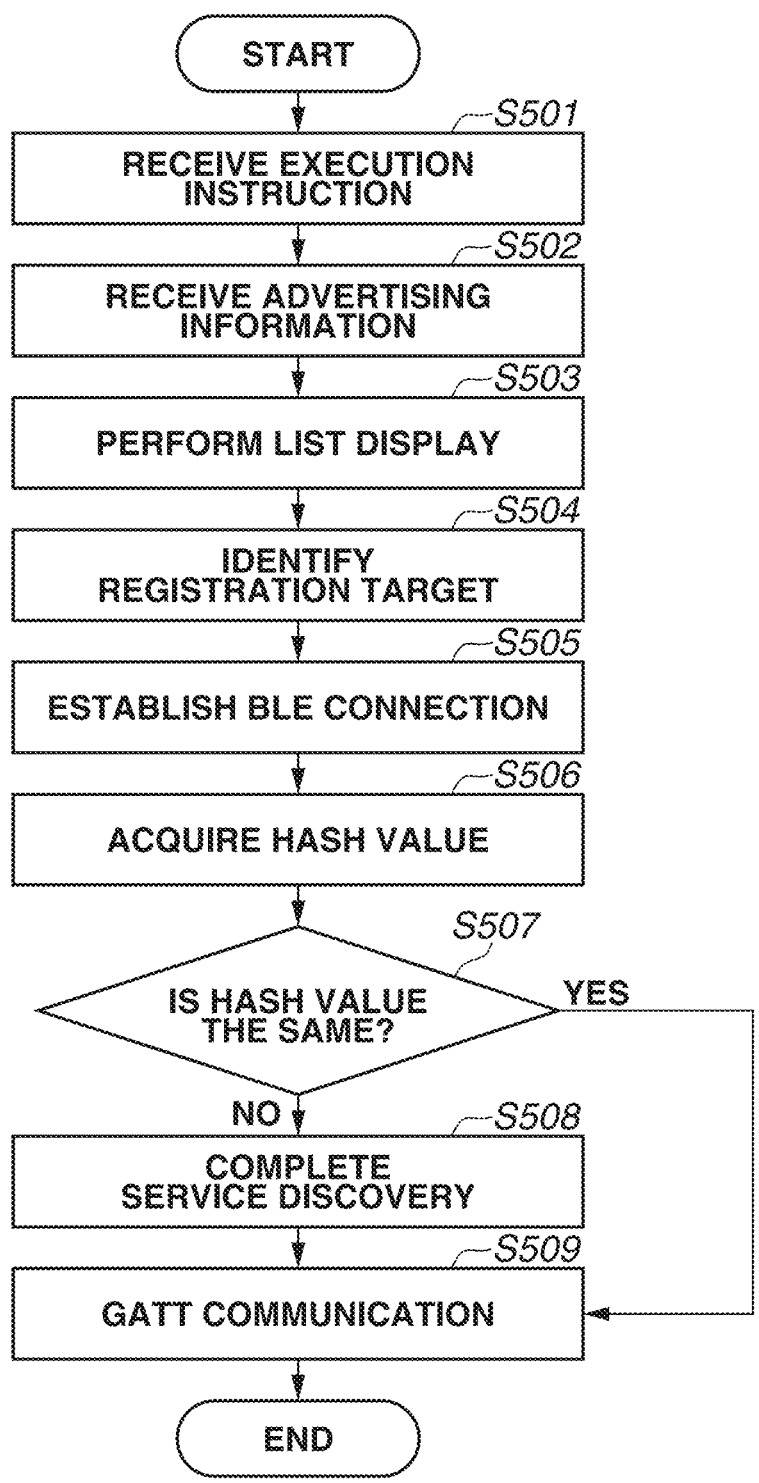
FIG. 5 is a flowchart illustrating processing for a registration function.

FIG. 5 is a flowchart illustrating a registration function which the information processing apparatus 101 executes (second communication processing). The present processing is implemented by the CPU 103 loading a control program and a printing application stored in the ROM 104 or an HDD (not illustrated) included in the information processing apparatus 101 onto the RAM 105 and executing the control program and the printing application. Moreover, the present processing is assumed to be started in a state in which the printing application is activated in the information processing apparatus 101. Moreover, the present processing is assumed to be started in a state in which paring of BLE is not being performed between the information processing apparatus 101 and the communication apparatus 151.

In step S501, the CPU 103 receives an execution instruction for the registration function from the user. The present processing corresponds to processing in step S1301.

In step S502, the CPU 103 receives advertising information. Furthermore, at this time, the information processing apparatus 101 may receive advertising information not only from the communication apparatus 151 but also from an apparatus other than the communication apparatus 151. The present processing corresponds to processing in step S1302 to step S1304.

In step S503, the CPU 103 displays, on the display unit 108, a selection screen used for receiving selection of an apparatus targeted for the registration function. The present processing corresponds to processing in step S1305.

In step S504, the CPU 103 identifies an apparatus targeted for the registration function, based on an input performed on the selection screen.

In step S505, the CPU 103 establishes BLE connection with the apparatus targeted for the registration function identified in step S504 and then starts service discovery. The present processing corresponds to processing in step S1306.

In step S506, the CPU 103 acquires a hash value from the apparatus targeted for the registration function identified in step S504. The present processing corresponds to processing in step S1307.

In step S507, the CPU 103 determines whether the hash value acquired in step S506 is the same as the previously acquired hash value. If the result of determination in step S507 is NO, the CPU 103 advances the processing to step S508, and if the result of determination in step S507 is YES, the CPU 103 interrupts service discovery with respect to the apparatus targeted for the registration function identified in step S504 and then advances the processing to step S509. The present processing corresponds to processing in step S1308.

In step S508, the CPU 103 continues service discovery, acquires a remaining piece of GATT configuration data, and caches the GATT configuration data.

In step S509, the CPU 103 executes a registration function based on GATT configuration data stored in the apparatus targeted for the registration function identified in step S504. The present processing corresponds to processing in step S1309 to step S1313.

In this way, in the first exemplary embodiment, the information processing apparatus 101 automatically performs service discovery beforehand. Therefore, in a function including GATT communication, such as a registration function, even in a state in which pairing of BILE is not being performed between the information processing apparatus 101 and the communication apparatus 151, it is possible to omit at least a part of service discovery. As a result, it is possible promptly proceed with a function including GATT communication.

Furthermore, while, in the above description, the registration function has been described as a function including GATT communication, the first exemplary embodiment is not limited to this. The function including GATT communication can be any function as long as it is a function in which GATT communication is performed in response to an instruction from the user.

For example, a handover function can be performed as a function including GATT communication. The handover function is a type of processing which is performed in response to an instruction for transmission of a job being issued by the user. In the handover function, the information processing apparatus 101 establishes BLE connection with the communication apparatus 151, and receives information for Wi-Fi-connecting to the communication apparatus 151 (for example, the above-mentioned first connection information) via GATT communication. Then, the information processing apparatus 101 Wi-Fi-connects to the communication apparatus 151 using the received information, and transmits a job to the communication apparatus 151 via the Wi-Fi connection. In this way, even in the handover function, it is possible to omit service discovery by the application of the first exemplary embodiment.

Moreover, for example, a setup function for Wi-Fi can be performed as a function including GATT communication. In the setup function for Wi-Fi, the information processing apparatus 101 establishes BLE connection with the communication apparatus 151, and transmits, to the communication apparatus 151 via GATT communication, information for Wi-Fi-connecting to an external access point. Accordingly, the communication apparatus 151 Wi-Fi-connects to the external access point using the received information. The external access point to which the communication apparatus 151 connects at this time can be an access point to which the information processing apparatus 101 is Wi-Fi-connecting, or can be an access point selected from a list of external access points to which the communication apparatus 151 is able to connect. In this latter case, the information processing apparatus 101 acquires, from the communication apparatus 151 via GATT communication, a list of external access points to which the communication apparatus 151 is able to connect, and displays the acquired list on the display unit 108, thus receiving selection. In this way, even in the setup function for it is possible to omit at least a part of service discovery by the application of the first exemplary embodiment.

Moreover, in the first exemplary embodiment, processing in step S506 to step S508 is assumed to be processing which is performed by the OS of the information processing apparatus 101. In other words, in a case where, in step S505, the printing application issues an instruction to the OS of the information processing apparatus 101 to establish BLE connection, the OS is assumed to automatically perform acquisition of a hash value and service discovery. However, the first exemplary embodiment is not limited to this, and processing in step S506 to step S508 can be performed, for example, under the instruction of the printing application.

As described above, in processing for automatically acquiring GATT configuration data, upon receiving advertising information, the information processing apparatus 101 determines whether GATT configuration data has already been acquired from an apparatus serving as a transmission source of the advertising information. Then, in a case where GATT configuration data has already been acquired from an apparatus serving as a transmission source of the advertising information, the information processing apparatus 101 does not perform acquisition of a hash value or GATT configuration data. However, in the communication apparatus 151, the structure of GATT data may be changed due to, for example, firmware update. In a case where the structure of GATT data has been changed, information which has been cached in the information processing apparatus 101 would become unable to be used. Then, in a case where time has passed since GATT configuration data has been cached, it is highly likely that the structure of GATT data has been changed. Therefore, in a second exemplary embodiment, a configuration in which, in a case where a predetermined time has elapsed since GATT configuration data has been cached, the information processing apparatus 101 re-performs acquisition of a hash value and caching of GATT configuration data is described. Furthermore, unless specifically described, the configuration of a communication system in the second exemplary embodiment is assumed to be similar to the configuration of the communication system in the first exemplary embodiment.

Figure 6:
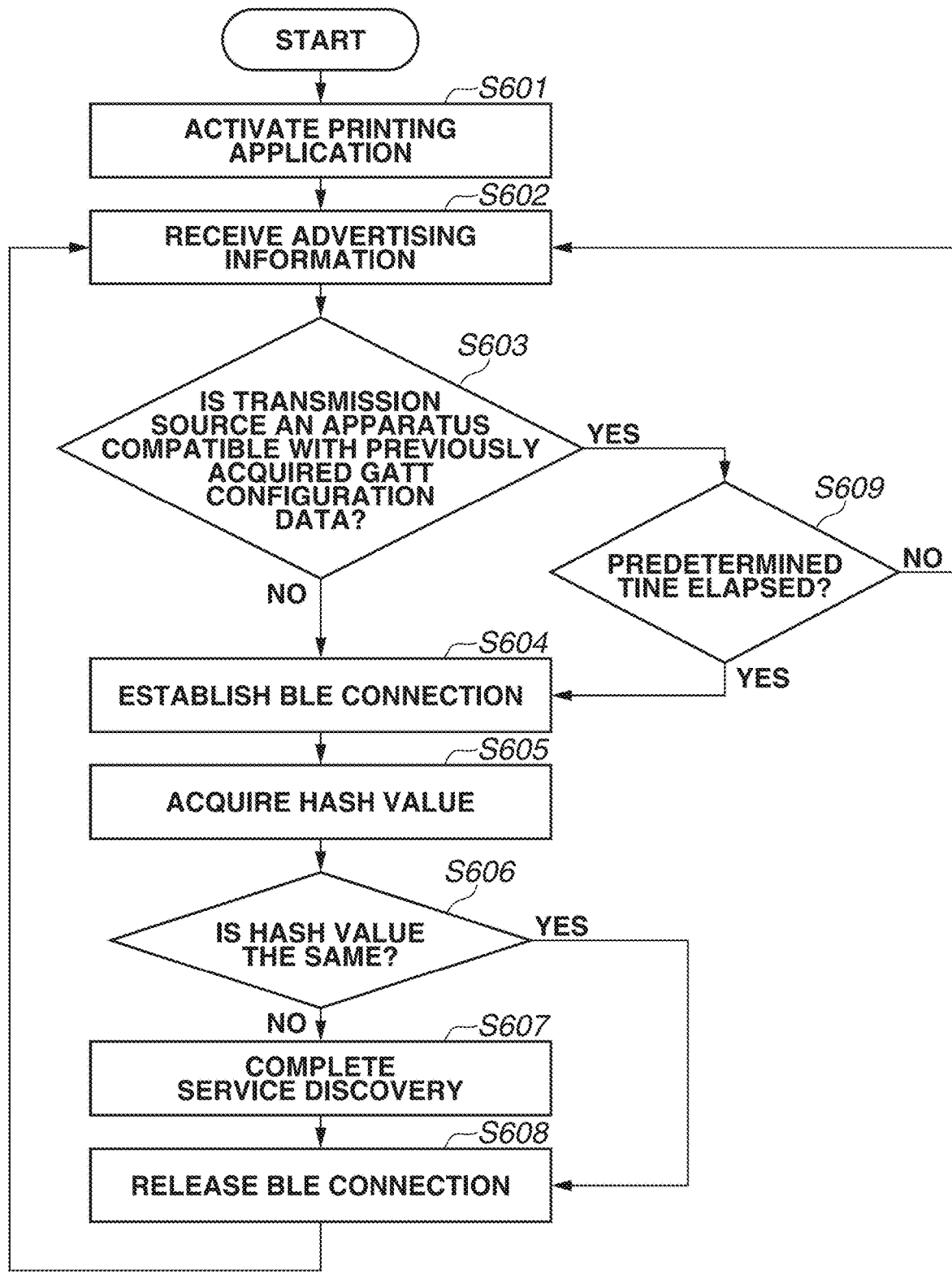
FIG. 6 is a flowchart illustrating processing for caching GATT configuration data.

FIG. 6 is a flowchart illustrating processing for caching GATT configuration data, which is performed by the information processing apparatus 101. The present processing is implemented by the CPU 103 loading a control program and a printing application stored in the ROM 104 or an HDD (not illustrated) included in the information processing apparatus 101 onto the RAM 105 and executing the control program and the printing application. Moreover, the present processing is started based on an instruction for activating the printing application being issued in the information processing apparatus 101.

Processing in step S601 to step S608 is similar to the processing in step S401 to step S408 and is, therefore, omitted from description. Furthermore, in step S607, not only GATT configuration data but also information about a time at which the GATT configuration data was acquired is assumed to be cached.

In step S609, which is performed if the result of determination in step S603 is YES, the CPU 103 determines whether a predetermined time has elapsed since the information processing apparatus 101 has acquired GATT configuration data from the apparatus serving as a transmission source of the advertising information received in step S602. The predetermined time is a time equivalent to, for example, one month. If the result of determination in step S609 is YES, the CPU 103 performs processing in step S604 and subsequent steps. More specifically, the CPU 103 acquires a hash value from the apparatus serving as a transmission source of the advertising information received in step S602 and checks in detail whether GATT configuration data stored in the apparatus has already been acquired. Then, if the GATT configuration data stored in the apparatus has previously been changed due to the elapse of time, the CPU 103 acquires GATT configuration data from the apparatus anew. Furthermore, at this time, the CPU 103 can discard the GATT configuration data previously acquired from the apparatus (not the latest GATT configuration data). On the other hand, if the result of determination in step S609 is NO, the CPU 103 returns the processing to step S602, in which, without acquiring a hash value and GATT configuration data from the apparatus anew, the CPU 103 waits for advertising information to be received from another apparatus.

With such a configuration employed, in a case where a time has elapsed since the preceding GATT configuration data has been acquired and, thus, the structure of GATT configuration data stored in the communication apparatus 151 has been changed, it is possible to re-acquire GATT configuration data.

As described above, in processing for automatically acquiring GATT configuration data, upon receiving advertising information, the information processing apparatus 101 determines whether GATT configuration data has already been acquired from an apparatus serving as a transmission source of the advertising information. Then, in a case where GATT configuration data has already been acquired from an apparatus serving as a transmission source of the advertising information, the information processing apparatus 101 does not perform acquisition of a hash value or GATT configuration data. In the communication apparatus 151, the structure of GATT data may be changed due to, for example, firmware update. In a case where the structure of GATT data has been changed, information which has been cached in the information processing apparatus 101 would become unable to be used. Then, in a case where advertising information which the communication apparatus 151 transmits has been changed from advertising information which has been transmitted when GATT configuration data has been acquired, it is highly likely that the structure of GATT data has been changed. Therefore, in a third exemplary embodiment, a configuration in which, in a case where advertising information which the communication apparatus 151 transmits has been changed from advertising information which has been transmitted when GATT configuration data has been acquired, the information processing apparatus 101 re-performs acquisition of a hash value and caching of GATT configuration data is described. Furthermore, unless specifically described, the configuration of a communication system in the third exemplary embodiment is assumed to be similar to the configuration of the communication system in the first exemplary embodiment.

Figure 7:
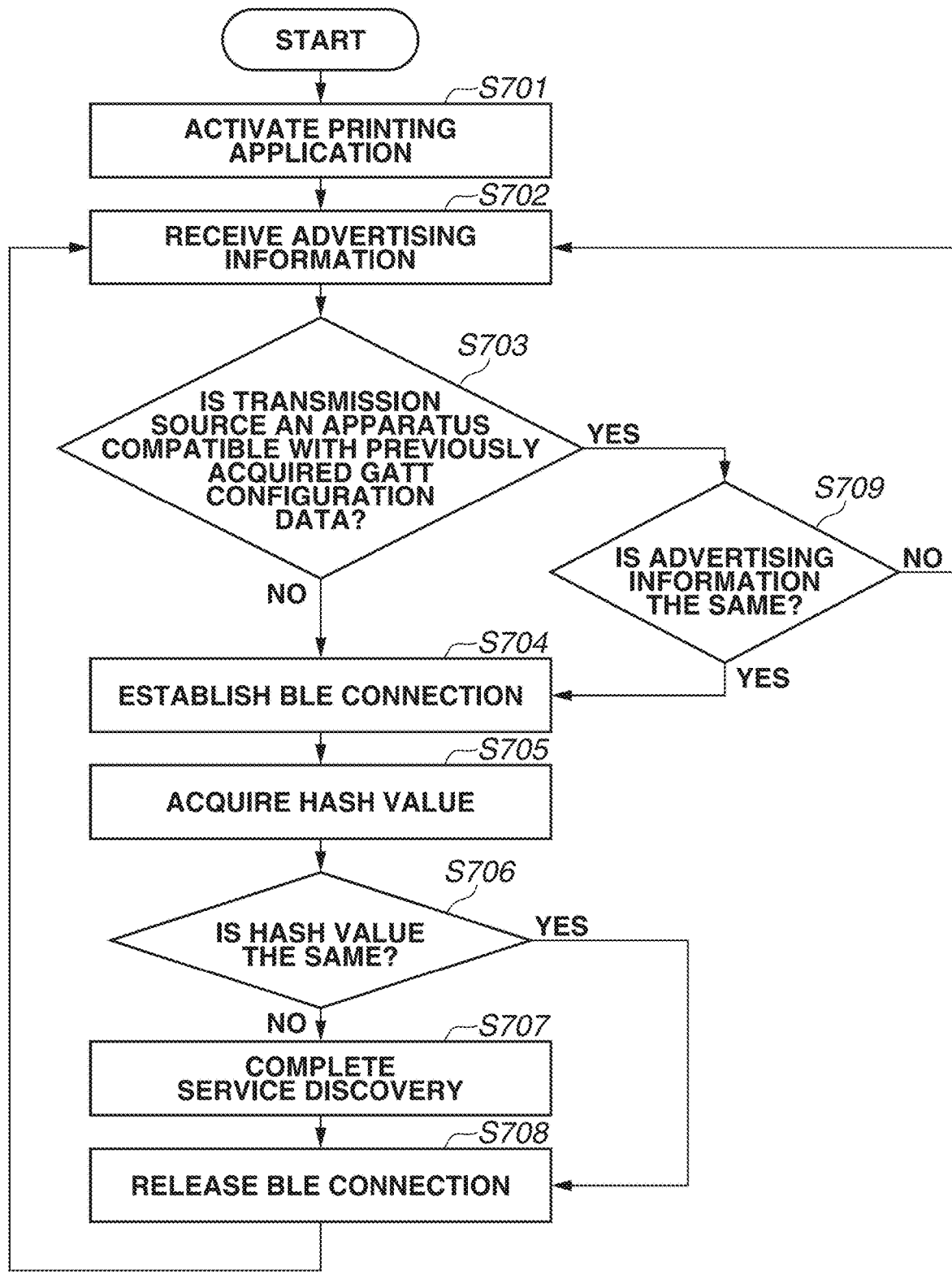
FIG. 7 is a flowchart illustrating processing for caching GATT configuration data.

FIG. 7 is a flowchart illustrating processing for caching GATT configuration data, which is performed by the information processing apparatus 101. The present processing is implemented by the CPU 103 loading a control program and a printing application stored in the ROM 104 or an HDD (not illustrated) included in the information processing apparatus 101 onto the RAM 105 and executing the control program and the printing application. Moreover, the present processing is started based on an instruction for activating the printing application being issued in the information processing apparatus 101.

Processing in step S701 to step S708 is similar to the processing in step S401 to step S408 and is, therefore, omitted from description. Furthermore, in step S707, advertising information which the apparatus serving as an acquisition source of GATT configuration data has been transmitting is also assumed to be cached in association with the GATT configuration data.

In step S709, which is performed if the result of determination in step S703 is YES, the CPU 103 determines whether the advertising information received in step S702 and the advertising information which was previously received from the apparatus serving as a transmission source of the advertising information received in step S702 match each other. As mentioned above, advertising information is associated with GATT configuration data which has been cached. Therefore, the previously cached advertising information is used as advertising information which was previously received from the apparatus serving as a transmission source of the advertising information received in step S702. If the result of determination in step S709 is YES, the CPU 103 performs processing in step S704 and subsequent steps. More specifically, the CPU 103 acquires a hash value from the apparatus serving as a transmission source of the advertising information received in step S702 and checks in detail whether GATT configuration data stored in the apparatus has already been acquired. Then, if the GATT configuration data stored in the apparatus has previously been changed due to the elapse of time, the CPU 103 acquires GATT configuration data from the apparatus anew. Furthermore, at this time, the CPU 103 can discard the GATT configuration data previously acquired from the apparatus (not the latest GATT configuration data). On the other hand, if the result of determination in step S709 is NO, the CPU 103 returns the processing to step S702, in which, without acquiring a hash value and GATT configuration data from the apparatus anew, the CPU 103 waits for advertising information to be received from another apparatus.

With such a configuration employed, in a case where advertising information which has been transmitted when the preceding GATT configuration data has been acquired has been changed and the structure of GATT data stored in the communication apparatus 151 has changed, it is possible to re-acquire GATT configuration data.

In the first exemplary embodiment, two methods of checking a hash value, i.e., the first acquisition method and the second acquisition method, have been described. In a fourth exemplary embodiment, a configuration in which the information processing apparatus 101 appropriately controls which of the two methods to use according to the situation is described. Furthermore, unless specifically described, the configuration of a communication system in the fourth exemplary embodiment is assumed to be similar to the configuration of the communication system in the first exemplary embodiment.

Figure 8:
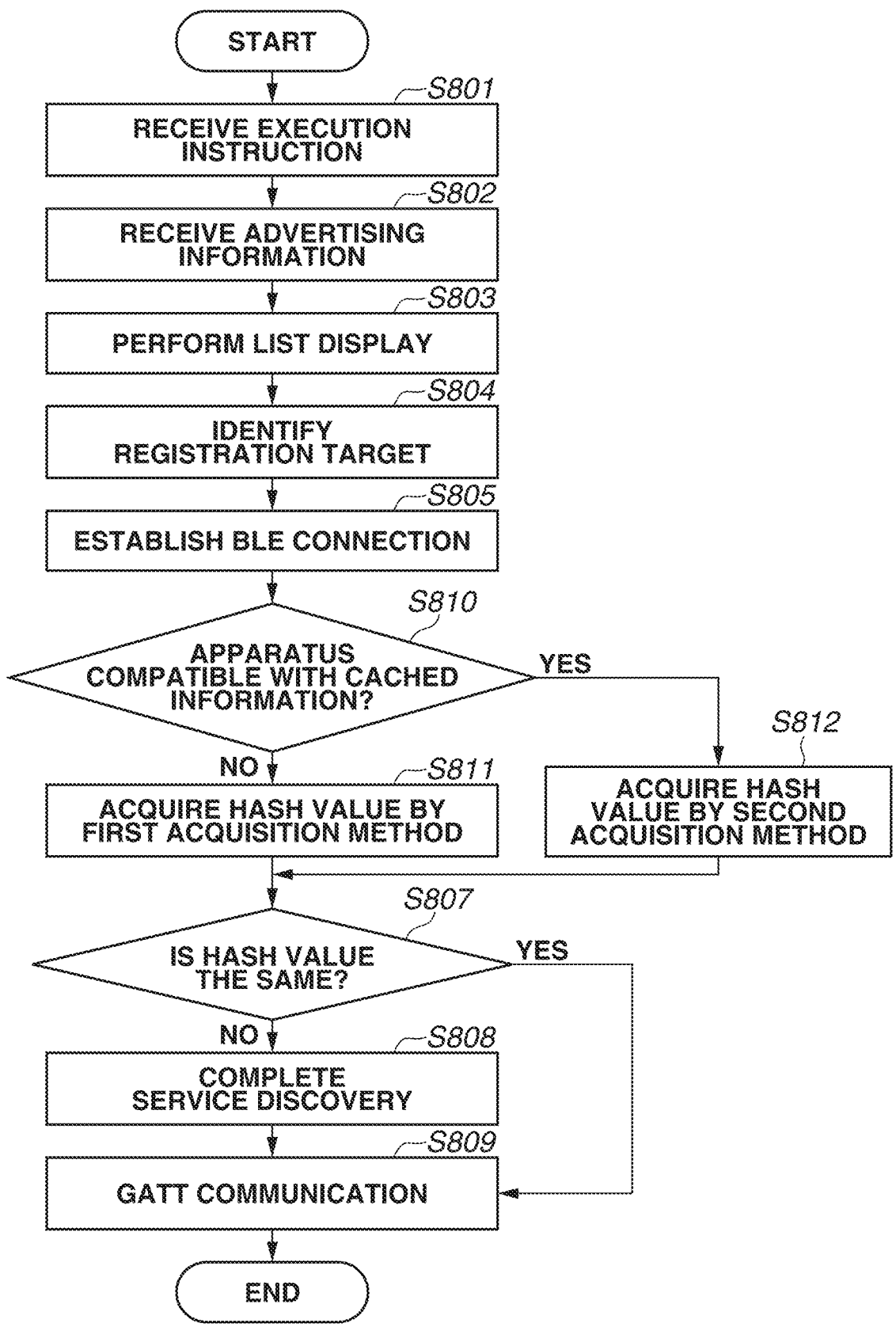
FIG. 8 is a flowchart illustrating processing for a registration function.

FIG. 8 is a flowchart illustrating a registration function which the information processing apparatus 101 executes. The present processing is implemented by the CPU 103 loading a control program and a printing application stored in the ROM 104 or an HDD (not illustrated) included in the information processing apparatus 101 onto the RAM 105 and executing the control program and the printing application. Moreover, the present processing is assumed to be started in a state in which the printing application is activated in the information processing apparatus 101.

Processing in step S801 to step S805 and processing in step S807 to S809 are similar to processing in step S501 to step S505 and processing in step S507 to step S509 and are, therefore, omitted from description.

In step S810, which is performed after step S805, the CPU 103 determines whether the communication apparatus 151 BLE-connected to the information processing apparatus 101 in step S805 is an apparatus compatible with GATT configuration data cached by the information processing apparatus 101. The apparatus compatible with GATT configuration data cached by the information processing apparatus 101 is, for example, an apparatus having the same identifier as that of the apparatus serving as an acquisition source of the cached GATT configuration data. The identifier is, for example, information indicating, for example, a name of the apparatus or the model name thereof, a vendor of the apparatus, or a service which the apparatus provides. In the fourth exemplary embodiment, during caching of GATT configuration data, the information processing apparatus 101 is assumed to also store, in association with the GATT configuration data to be cached, an identifier which the acquisition source of the GATT configuration data has. If the result of determination in step S810 is NO, the CPU 103 advances the processing to step S811, and, if the result of determination in step S810 is YES, the CPU 103 advances the processing to step S812. Furthermore, in a case where there is a plurality of pieces of cached GATT configuration data, the CPU 103 performs the determination in step S810 using each of the plurality of pieces of cached GATT configuration data. Then, in a case where the communication apparatus 151 is compatible with at least one of the plurality of pieces of cached GATT configuration data, the result of determination in step S810 is YES, and, in a case where the communication apparatus 151 is compatible with none of the plurality of pieces of cached GATT configuration data, the result of determination in step S810 is NO.

In a case where the communication apparatus 151 BLE-connected to the information processing apparatus 101 is an apparatus which does not have the same identifier as that of the apparatus serving as an acquisition source of the cached GATT configuration data, it is highly likely that the information processing apparatus 101 has not already cached GATT configuration data stored in the communication apparatus 151. Moreover, in a case where the information processing apparatus 101 has cached a plurality of pieces of GATT configuration data, the information processing apparatus 101 is not able to identify GATT configuration data which is likely to be GATT configuration data stored in the communication apparatus 151 out of the plurality of pieces of GATT configuration data. In a case where the information processing apparatus 101 performs the second acquisition method in a state in which the information processing apparatus 101 is not able to identify GATT configuration data which is likely to be GATT configuration data stored in the communication apparatus 151, the information processing apparatus 101 takes much time to determine whether the information processing apparatus 101 has cached GATT configuration data stored in the communication apparatus 151. This is because, in this configuration, in a case where, as a result of trying to acquire a hash value using any piece of GATT configuration data, the CPU 103 has not been able to acquire a hash value, the CPU 103 needs to try to acquire a hash value again using another piece of GATT configuration data. Therefore, the information processing apparatus 101 needs to repeat trial of acquisition of a hash value using the second acquisition method a number of times corresponding to the number of pieces of GATT configuration data cached by the information processing apparatus 101.

Therefore, in step S811, which is performed if the result of determination in step S810 is NO, the CPU 103 acquires a hash value by the first acquisition method, More specifically, the CPU 103 performs service discovery, identifies a region in which a hash value is contained based on at least part of GATT configuration data acquired by service discovery, and, after that, tries to acquire a hash value. After that, the CPU 103 advances the processing to step S807, in which the CPU 103 determines whether the hash value acquired in step S811 and the previously cached hash value match each other.

On the other hand, in a case where the communication apparatus 151 BLE-connected to the information processing apparatus 101 is an apparatus which has the same identifier as that of the apparatus serving as an acquisition source of the cached GATT configuration data, it is highly likely that the information processing apparatus 101 has already cached GATT configuration data stored in the communication apparatus 151. Moreover, in a case where the information processing apparatus 101 has cached a plurality of pieces of GATT configuration data, the information processing apparatus 101 is able to identify GATT configuration data which is likely to be GATT configuration data stored in the communication apparatus 151 out of the plurality of pieces of GATT configuration data. When the information processing apparatus 101 performs the second acquisition method in a state in which the information processing apparatus 101 is able to identify GATT configuration data which is likely to be GATT configuration data stored in the communication apparatus 151, the information processing apparatus 101 is able to promptly acquire a hash value from the communication apparatus 151.

Therefore, in step S812, which is performed if the result of determination in step S810 is YES, the CPU 103 acquires a hash value by the second acquisition method. More specifically, without performing service discovery, the CPU 103 identifies a region in which a hash value is contained based on the cached GATT configuration data which is likely to be GATT configuration data stored in the communication apparatus 151, and, after that, tries to acquire a hash value. After that, the CPU 103 advances the processing to step S807, in which the CPU 103 determines whether the hash value acquired in step S812 and the previously cached hash value match each other.

Processing in step S807 and subsequent eps is similar to the processing in step S507 and subsequent steps.

With such a configuration employed, it is possible to perform acquisition of a hash value in a more appropriate method.

Furthermore, while the determination in step S810 is equivalent to a determination as to which of the first acquisition method and the second acquisition method to use, the timing at which the determination is performed is not limited. Specifically, for example, the determination can be performed between processing in step S804 and processing in step S805. In this case, the CPU 103 determines whether the apparatus identified as a registration target in step S804 is an apparatus compatible with the GATT configuration data cached by the information processing apparatus 101. Then, if the result of determination in step S810 is YES, the CPU 103 performs step S812 after step S805, and, if the result of determination in step S810 is NO, the CPU 103 performs step S811 after step S805.

The present disclosure can be implemented by processing for supplying a program for implementing one or more functions in the above-described exemplary embodiments to a system or apparatus via a network or a storage medium and causing one or more processors in a computer of the system or apparatus to read and execute the program. Moreover, the present disclosure can also be implemented by a circuit which implements one or more functions (for example, an application specific integrated circuit (ASIC)).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (MID), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-102860 filed May 31, 2019, which is hereby incorporated by reference herein in its entirety.

What is claimed is:

1. A control method for an information processing apparatus that performs communication with a communication apparatus using Bluetooth Low Energy (BLE), the communication apparatus being an apparatus that is capable of performing BLE communication, the control method comprising:

performing processing for autonomously establishing a first connection, using BLE, with the communication apparatus without receiving, from a user, an execution instruction for a predetermined function including processing for establishing a connection using BLE between the communication apparatus and the information processing apparatus;

performing processing for establishing a second connection using BLE with the communication apparatus, in a case where the execution instruction for the predetermined function is received from the user; and performing Generic Attribute Profile (GATT) communication included in the predetermined function, via the second connection, based on structure information indicating a structure of GATT data, wherein, in response to establishment of the first connection, the structure information is acquired anew, and wherein, in response to establishment of the second connection, at least part of structure information indicating a structure of GATT data stored in the communication apparatus to which the information processing apparatus has ever become connected via the first connection and which has ever transmitted the structure information to the information processing apparatus is not acquired anew.

2. The control method according to claim 1, further comprising receiving advertising information, wherein the first connection with the communication apparatus is established based on the advertising information.

3. The control method according to claim 2, further comprising determining, based on the received advertising information, whether the communication apparatus serving as a transmission source of the received advertising information is the communication apparatus compatible with the structure information which the information processing apparatus previously acquired, wherein, if it is determined that the communication apparatus serving as the transmission source of the received advertising information is the communication apparatus compatible with the structure information, information indicating a structure of GATT data stored in the communication apparatus serving as the transmission source of the received advertising information is not acquired, and wherein, if it is determined that the communication apparatus serving as the transmission source of the received advertising information is not the communication apparatus compatible with the structure information which the information processing apparatus previously acquired, information indicating a structure of GATT data stored in the communication apparatus serving as the transmission source of the received advertising information is acquired.

4. The control method according to claim 3, further comprising determining, in a case where the communication apparatus serving as the transmission source of the received advertising information is the communication apparatus compatible with the structure information, whether a predetermined time has elapsed from a time when the structure information which the information processing apparatus has previously acquired was acquired,
- wherein, if it is determined that the predetermined time has not elapsed, the structure information is not acquired again, and
- wherein, if it is determined that the predetermined time has elapsed, the structure information is acquired anew.

5. The control method according to claim 3, further comprising determining, in a case where the communication apparatus serving as the transmission source of the received advertising information is the communication apparatus compatible with the structure information, whether the received advertising information and advertising information previously received from the communication apparatus serving as the transmission source of the received advertising information match each other,
- wherein, if it is determined that the received advertising information and the advertising information previously received from the communication apparatus serving as the transmission source of the received advertising information match each other, the structure information is not acquired, and
- wherein, if it is determined that the received advertising information and the advertising information previously received from the communication apparatus serving as the transmission source of the received advertising information do not match each other, the structure information is acquired.

6. The control method according to claim 3, wherein the communication apparatus compatible with the structure information is at least one of the communication apparatus to which the information processing apparatus has ever become connected using BLE and other apparatus having identification information which is the same as identification information of the communication apparatus to which the information processing apparatus has ever become connected using BLE.

7. The control method according to claim 1,
- wherein, in response to establishing the first connection, a predetermined type of information included in GATT data stored in the communication apparatus is acquired via the first connection, wherein the predetermined type of information acquired via the first connection is a first predetermined type of information,
- wherein, in response to establishing the second connection, at least part of information indicating a structure of GATT data stored in the communication apparatus is acquired until a region in which the predetermined type of information included in GATT data stored in the communication apparatus becomes able to be identified,
- wherein the predetermined type of information is acquired via the second connection, wherein the predetermined type of information acquired via the second connection is a second predetermined type of information,
- wherein, in a case where the first predetermined type of information and the second predetermined type of information match each other, the remaining part of the structure information is not acquired anew, and
- wherein, in a case where the first predetermined type of information and the second predetermined type of information do not match each other, the remaining part of the structure information is acquired anew.

8. The control method according to claim 7,
- wherein, in a case where the communication apparatus connecting with the information processing apparatus via the first connection and the communication apparatus connecting with the information processing apparatus via the second connection are the same, the first predetermined type of information and the second predetermined type of information match each other, and
- wherein, in a case where the communication apparatus connecting with the information processing apparatus via the first connection and the communication apparatus connecting with the information processing apparatus via the second connection are not the same, the first predetermined type of information and the second predetermined type of information do not match each other.

9. The control method according to claim 7,
- wherein, in a case where first predetermined identification information stored in the communication apparatus connecting with the information processing apparatus via the first connection and second predetermined identification information stored in the communication apparatus connecting with the information processing apparatus via the second connection are the same, the first predetermined type of information and the second predetermined type of information match each other, and
- wherein, in a case where the first predetermined identification information and the second predetermined identification information are not the same, the first predetermined type of information and the second predetermined type of information do not match each other.

10. The control method according to claim 7,
- wherein, in a case where a first structure of GATT data stored in the communication apparatus connecting with the information processing apparatus via the first connection and a second structure of GATT data stored in the communication apparatus connecting with the information processing apparatus via the second connection are the same, the first predetermined type of information and the second predetermined type of information match each other, and
- wherein, in a case where the first structure of GATT data and the second structure of GATT data are not the same, the first predetermined type of information and the second predetermined type of information do not match each other.

11. The control method according to claim 7, wherein the predetermined type of information is a hash value.

12. The control method according to claim 1,
- wherein, in response to establishing the first connection, predetermined information included in GATT data stored in the communication apparatus to which the information processing apparatus is connected via the first connection and the structure information is acquired,
- wherein region information, for identifying a region in which the predetermined information was previously stored, is identified based on the structure information,
- wherein, in response to establishing the second connection, specific information is acquired from a region corresponding to the region information out of regions included in GATT data stored in the communication apparatus to which the information processing apparatus is connected via the second connection, and wherein, in a case where the predetermined information and the specific information match each other, the structure information is not acquired anew, and, in a case where the predetermined information and the specific information do not match each other, the structure information is acquired anew.

13. The control method according to claim 12,
wherein, in a case where the communication apparatus connecting with the information processing apparatus via the first connection and the communication apparatus connecting with the information processing apparatus via the second connection are the same, the predetermined information and the specific information match each other, and
wherein, in a case where the communication apparatus connecting with the information processing apparatus via the first connection and the communication apparatus connecting with the information processing apparatus via the second connection are not the same, the predetermined information and the specific information do not match each other.

14. The control method according to claim 12,
wherein, in a case where first predetermined identification information stored in the communication apparatus connecting with the information processing apparatus via the first connection and second predetermined identification information stored in the communication apparatus connecting with the information processing apparatus via the second connection are the same, the predetermined information and the specific information match each other, and
wherein, in a case where the first predetermined identification information stored in the communication apparatus connecting with the information processing apparatus via the first connection and the second predetermined identification information stored in the communication apparatus connecting with the information processing apparatus via the second connection are not the same, the predetermined information and the specific information do not match each other.

15. The control method according to claim 12,
wherein, in a case where a first structure of GATT data stored in the communication apparatus connecting with the information processing apparatus via the first connection and a structure of GATT data stored in the communication apparatus connecting with the information processing apparatus via the second connection are the same, the predetermined information and the specific information match each other, and
wherein, in a case where the structure of GATT data stored in the communication apparatus connecting with the information processing apparatus via the first connection and the structure of GATT data stored in the communication apparatus connecting with the information processing apparatus via the second connection are not the same, the predetermined information and the specific information do not match each other.

16. The control method according to claim 12, wherein the predetermined information is a hash value, and the region information is a handle value.

17. The control method according to claim 1, wherein the predetermined function includes processing for registering information about the communication apparatus connecting with the information processing apparatus via the second connection, with a predetermined program which is able to execute the predetermined function, and at least one of processing for acquiring, via the second connection, connection information for connecting to the communication apparatus connecting with the information processing apparatus via the second connection by a communication method other than BLE and processing for transmitting, via the second connection, information for causing the communication apparatus and an apparatus external from the communication apparatus, and external from the information processing apparatus, to connect to each other by the communication method other than BLE.

18. The control method according to claim 1, wherein, even if the second connection is established in a state in which pairing is not being performed by BLE between the communication apparatus and the information processing apparatus, at least part of the structure information is not acquired anew.

19. The control method according to claim 1, further comprising transmitting a print job for causing the communication apparatus to perform printing.

20. An information processing apparatus that performs communication with a communication apparatus using Bluetooth Low Energy (BLE), the communication apparatus being an apparatus that is capable of performing BLE communication, the information processing apparatus comprising:
a first establishment unit configured to autonomously establish a first connection, using BLE, between the communication apparatus and the information processing apparatus without receiving, from a user, an execution instruction for a predetermined function including processing for establishing a connection using BLE between the communication apparatus and the information processing apparatus;
a second establishment unit configured to establish a second connection using BLE between the communication apparatus and the information processing apparatus in response to receiving, from the user, the execution instruction for the predetermined function; and
a communication unit configured to perform Generic Attribute Profile (GATT) communication included in the predetermined function, via the second connection, based on structure information indicating a structure of GATT data,
wherein, in response to the first connection being established, the structure information is acquired anew, and
wherein, in response to the second connection being established, at least part of structure information indicating a structure of GATT data stored in the communication apparatus to which the information processing apparatus has ever become connected via the first connection and which has ever transmitted the structure information to the information processing apparatus is not acquired anew.

* * * * *